US012300203B2

(12) United States Patent
Vorobyev et al.

(10) Patent No.: US 12,300,203 B2
(45) Date of Patent: *May 13, 2025

(54) APPARATUS, METHOD, AND COMPUTER-READABLE MEDIUM FOR GENERATING MUSICAL PIECES

(71) Applicant: MIXED IN KEY LLC, Miami, FL (US)

(72) Inventors: Yakov Vorobyev, Miami, FL (US); Louis Ng, Alhambra, CA (US); Michael Cupino, Miami, FL (US); Matthew Donner, Davis, CA (US); John Batka, Richmond, VA (US)

(73) Assignee: MIXED IN KEY LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,968

(22) Filed: May 18, 2023

(65) Prior Publication Data

US 2024/0135906 A1 Apr. 25, 2024
US 2024/0233692 A9 Jul. 11, 2024

Related U.S. Application Data

(63) Continuation of application No. 17/150,879, filed on Jan. 15, 2021, now Pat. No. 11,663,998, which is a (Continued)

(51) Int. Cl.
*G10H 1/00* (2006.01)

(52) U.S. Cl.
CPC ......... *G10H 1/0025* (2013.01); *G10H 1/0066* (2013.01); *G10H 2220/036* (2013.01); *G10H 2220/116* (2013.01); *G10H 2220/131* (2013.01)

(58) Field of Classification Search
CPC ............... G10H 1/0025; G10H 1/0066; G10H 2220/036; G10H 2220/116; G10H 2220/131

(Continued)

(56) References Cited

U.S. PATENT DOCUMENTS 4,450,742 A * 5/1984 Sugiura .................... G10H 1/38
84/715
4,982,643 A * 1/1991 Minamitaka ............. G10H 1/36
84/613

(Continued)

OTHER PUBLICATIONS

Cubase Pro: Workflow Benefits Of Melodyne With ARA 2; Sound On Sound; Steinberg Cubase Pro Tips & Techniques by John Walden; Published Sep. 2019; https://forums.steinberg.net/t/ara-2-enhancement-for-melodyne-chord-track-to-cubase/587586; retrieved Jul. 13, 2021; 6 pages.

(Continued)

*Primary Examiner* — Christina M Schreiber
(74) *Attorney, Agent, or Firm* — Oblon, McClelland, Maier & Neustadt, L.L.P.

(57) ABSTRACT

An apparatus, method, and computer-readable storage medium that generate a harmonized musical piece. The method includes receiving a chord selection including a musical key and a scale selection, generating, within a digital audio work session, a chord progression sequence based on the received chord selection, in response to a detected chord selection change, modifying the chord progression sequence to include a chord progression corresponding to the chord selection change, setting the chord progression sequence as a master sequence, in response to detecting a second progression sequence within the digital audio work session, transmitting an identifier to the second progression sequence setting it as a slave sequence, and establishing a synchronized communication link between (Continued)

the master and the slave sequences such that changes made in the master sequence are automatically effectuated in the slave sequence, and combining the master sequence and the slave sequence to form a composed musical piece.

19 Claims, 26 Drawing Sheets

Related U.S. Application Data continuation of application No. 16/889,710, filed on Jun. 1, 2020, now Pat. No. 10,971,122, which is a continuation of application No. 15/929,065, filed on Nov. 26, 2018, now Pat. No. 10,714,065.

(60) Provisional application No. 62/704,012, filed on Jun. 8, 2018.

(58) Field of Classification Search
USPC ........................................................ 84/609
See application file for complete search history.

(56) References Cited

U.S. PATENT DOCUMENTS 5,235,125 A * 8/1993 Sato .................... G10H 1/0025 84/613
5,418,326 A * 5/1995 Ikeda ...................... G10H 1/38 84/669
5,440,756 A * 8/1995 Larson .................. G10H 1/383 84/637
5,753,843 A * 5/1998 Fay ...................... G10H 1/0025 84/613
5,783,767 A * 7/1998 Shinsky .................. G10H 1/38 84/657
5,902,949 A * 5/1999 Mohrbacher ........ G10H 1/0008 84/645
6,107,557 A * 8/2000 Fukada ............... G09B 15/003 84/DIG. 22
6,153,821 A * 11/2000 Fay ......................... G10H 1/40 84/637
6,309,301 B1 * 10/2001 Sano ...................... A63F 13/33 463/40
6,433,266 B1 * 8/2002 Fay ........................ G10H 7/002 84/634
7,129,408 B2 * 10/2006 Uehara ................ G10H 1/0066 84/645
7,714,222 B2 * 5/2010 Taub .................... G10H 1/0058 84/600
7,807,916 B2 * 10/2010 Georges ............... G10H 1/0025 84/609
7,858,870 B2 * 12/2010 Riopelle ................ G06F 3/011 84/625
8,022,287 B2 * 9/2011 Yamashita ........... G11B 27/105 84/649
8,444,452 B2 * 5/2013 Dang ....................... A63H 5/00 446/491
9,076,264 B1 * 7/2015 Gillespie ............... G06F 3/0484
10,032,443 B2 * 7/2018 Braasch ................... G10H 1/38
10,262,643 B1 * 4/2019 Kinter ...................... G10H 5/06
10,714,065 B2 * 7/2020 Vorobyev ............. G10H 1/0058
10,971,122 B2 * 4/2021 Vorobyev ................. G10H 1/38
11,663,998 B2 * 5/2023 Vorobyev ............. G10H 1/0025 84/609
2001/0007221 A1 * 7/2001 Uehara ................ G10H 1/0066 84/649
2002/0017188 A1 * 2/2002 Aoki ........................ G10H 1/36 84/611
2004/0003707 A1 * 1/2004 Mazzoni ............. G10H 1/0025 84/613
2006/0000344 A1 * 1/2006 Basu .................... G10H 1/0025 84/612
2008/0000345 A1 * 1/2008 Hasegawa ................ G10H 1/38 84/613
2009/0084248 A1 * 4/2009 Furukawa ............. G10H 1/344 84/609
2009/0088877 A1 * 4/2009 Terauchi ................ G10H 1/368 700/94
2009/0249945 A1 * 10/2009 Yamashita ............... G10H 1/40 84/613
2009/0260507 A1 * 10/2009 Gannon ............... G10H 1/0025 84/613
2009/0293706 A1 * 12/2009 Yasushi .................. G10H 1/383 84/613
2013/0290818 A1 * 10/2013 Arrasvuori ......... H04N 21/4383 715/201
2013/0298750 A1 * 11/2013 Kira ....................... G10H 1/386 84/613
2014/0109752 A1 * 4/2014 Hilderman ............... G10H 1/44 84/613
2014/0140536 A1 * 5/2014 Serletic, II ............ G06F 3/0481 381/98
2014/0323036 A1 * 10/2014 Daley .................... H04H 20/38 455/3.06
2017/0084258 A1 * 3/2017 Swiggett .................. G10H 1/38
2017/0092247 A1 * 3/2017 Silverstein ............. G06N 20/00
2017/0287457 A1 * 10/2017 Vorobyev ............ G10H 1/0033
2018/0335492 A1 * 11/2018 Rinck .................. G10H 1/0066
2018/0357991 A1 * 12/2018 Barry ..................... G10H 1/386
2019/0378482 A1 * 12/2019 Vorobyev ............... G10H 1/386
2020/0111467 A1 * 4/2020 Hofuku ..................... G10H 1/38
2020/0294479 A1 * 9/2020 Vorobyev ................. G10H 1/38
2020/0372882 A1 * 11/2020 Pachet ................. G10H 1/0008
2021/0241732 A1 * 8/2021 Brosius ................ G10H 1/0025
2021/0312895 A1 * 10/2021 Vorobyev ............ G10H 1/0025
2021/0407472 A1 * 12/2021 Park ......................... G10G 1/04

OTHER PUBLICATIONS

ARA 2 Enhancement for Melodyne Chord Track to Cubase; Steinberg Forums; Dec. 7, 2020; https://www.google.com/amp/s/www.soundonsound.com/techniques/cubase-pro-workflow-benefits-melodyne-ara-2%3Famp; retrieved Jul. 13, 2021; 3 pages.
Neutron 3 Relay; iZotope; URL: https://www.izotope.com/en/products/neutron/features/relay.html; Sep. 2020, 2 pages.
Will Hunt; "How Inter-Plugin Communication Shows Up in Your Workflow"; iZotope; URL: https://www.izotope.com/en/learn/inter-plugin-communication-explained.html; 2 pages.
Getting Started with Neutron 2; URL: https://www.izotope.com/en/learn/getting-started-with-neutron-2.html; Oct. 17, 2017; 2 pages.
Odesi: "the start of your musical journey"; Miami, US, Dec. 9, 2015; 3 pages.
Odesi: "Harmonic Sketching From Mixed In Key"; URL: https://djworx.com/odesi-harmonic-sketching-mixed-key/; Dec. 9, 2015; 12 pages.
Antares: Auto-Key; Automatic Key and Scale Detection; URL: https://web.archive.org/web/20190127053414/https://www.antarestech.com/product/auto-key; Jan. 2019; 5 pages.
Richard Portelli; Orb Composer; Getting Started; URL: https://orb-composer-wszhqtiki7xhcykivf.netdna-ssi-com/wp-content/uploads/2018/04/GettingStarted 1.0.0 REV2.pdf; Apr. 1, 2018; 33 pages.
Pro Audio Filed: Hexachords Orb Composer (review); URL: https://theproaudiofiles.com/hexachords-orb-composer-review/; Apr. 2018; 8 pages.
PG Music: Band in a Box (New Features); URL: https://www.pgmusic.com/support.bbplugin.htm; Dec. 2018; 4 pages.
PG Music: Band in a Box (DAW Plugin Help); URL: https://www.pgmusic.com/forums/ubbthreads.pho?ubb=showflat&Number=508338; Dec. 2018; 21 pages.

* cited by examiner

Removing a Chords Plugin

APPARATUS, METHOD, AND COMPUTER-READABLE MEDIUM FOR GENERATING MUSICAL PIECES

CROSS-REFERENCE TO RELATED APPLICATIONS

The present application is a continuation of U.S. application Ser. No. 17/150,879, filed Jan. 15, 2021, which is a continuation of U.S. application Ser. No. 16/889,710, filed Jun. 1, 2020, now U.S. Pat. No. 10,971,122, issued Apr. 6, 2021, which is a continuation of U.S. application Ser. No. 15/929,065, filed Nov. 26, 2018, now U.S. Pat. No. 10,714,065, issued Jul. 14, 2020, which is based upon and claims the benefit of priority from prior Provisional Patent Application Ser. No. 62/704,012, filed Jun. 8, 2018, the entire contents of each of which are herein incorporated by reference.

BACKGROUND

Field

Embodiments described herein relate to the field of generating and harmonically connecting chords, melodies, basslines, and other parts of musical pieces.

Background

Musical composition can refer to an original piece of music, either a song or an instrumental music piece, or a combination of instrumental music pieces, the structure of a musical piece, or the process of creating or writing a new song or piece of music. One method of composing music is starting by using a chord progression. Chords could be selected to reflect the tone of the emotion being conveyed in a song. For example, selecting a minor key, but with mostly major chords (e.g., III, VI, VII) might convey a "hopeful" feeling. Other chord selections and progressions may convey a different tone altogether.

However, it can be very difficult generating complete and harmonized musical pieces with multiple instruments (for example, writing an orchestra score or a song for a band) due to complexity and variation of different chords, melodies, and basslines, rhythms, and traits unique to each music genre. That is especially true for composers that do not possess a full requisite background to compose such complete musical pieces.

Accordingly, the present disclosure provides an apparatus, method and computer-readable medium for generating musical pieces that connects chord progressions with melodies and basslines that contain desired amount of tension that makes music sound more interesting and musical.

BRIEF DESCRIPTION OF THE DRAWINGS

The disclosure will be better understood from reading the description which follows and from examining the accompanying figures. These figures are provided solely as non-limiting examples of the embodiments. In the drawings.

DETAILED DESCRIPTION

Figure 1:
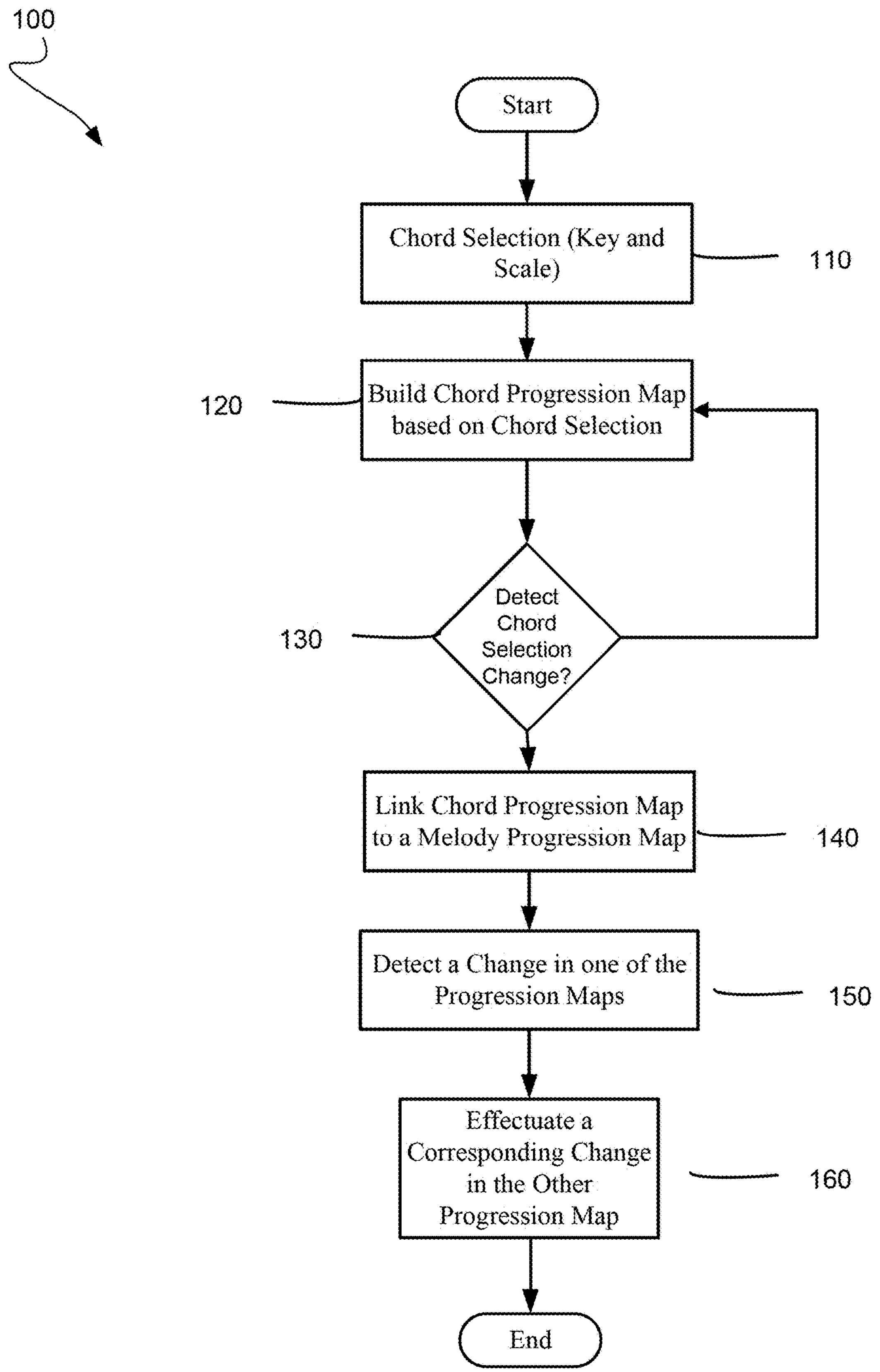
FIG. 1 illustrates a flowchart of a process according to one embodiment.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

FIG. 1 illustrates a flowchart of a music composition process according to one embodiment. In one aspect of the present disclosure, music composition may be performed using virtual studio technology (VST) that may be incorporated as plugins within digital audio workstations (DAW). As such, VST may be an audio plugin software interface that integrates software synthesizers and effects in DAW and may further use digital signal processing to simulate traditional recording studio hardware in software. VSTs can communicate with DAWs using a Musical Instrument Digital Interface (MIDI) messages.

MIDI is a standard protocol which was originally developed to permit electronic instruments such as synthesizers to communicate with each other. One common use of the protocol is permitting a musician to play more than one electronic instrument at once. The instrument that the musician is actually playing not only generates sounds, but also generates a sequence of event messages. An event message may for example be a note on message that indicates that a note of a given pitch has started to sound or a note off message that indicates that the note has ceased sounding. Many other kinds of event messages are defined as well. Another instrument receives the event messages from the first instrument and responds by performing the actions indicated in the messages. Thus, if the message is a note on message, the other instrument will begin sounding the note, and will thus "play along with" the first instrument. For purposes of the present disclosure, the event messages can be divided into two classes: the note on and note off messages and the remaining messages, which will be termed herein control messages. Accordingly, in one aspect, these will be the messages used to link the progression maps to play along one another as will be further described herein.

According to FIG. 1, the system is designed such that anyone can be able to compose musical pieces, regardless of their level of musical knowledge and construction. As such, in one embodiment, a music composer may start a music composition session 100 by performing a chord selection process 110, including selecting a key and scale within which the musical piece will reside. It can be understood that the initial selection of a chord is an exemplary illustration and other selections, such as those of a melody, a bass, or the like may be selected as the initial basing point for the musical piece.

In music theory, the key of a piece of music is the group of pitches, or scale that forms the basis of a music composition. The group features a tonic note and its corresponding chords, which provides a subjective sense of arrival and rest, and also has a unique relationship to other pitches of the same group, their corresponding chords, and pitches and chords. The key may be in the major or minor mode. Similarly, the scale is any set of musical notes ordered by fundamental frequency or pitch. A scale ordered by increasing pitch is an ascending scale, and a scale ordered by decreasing pitch is a descending scale.

Music composition session 100 may further include building a chord progression map 120 based on the selected chord, and a detection of a chord selection is performed 130. If a different chord is selected (e.g. a new chord is selected), then the process starts again at building a chord progression map 120 followed by a detection step 130. If no chord selection change is detected, then music composition session may proceed to link the chord progression map to a melody progression map 140. This linking may be performed by the transmission and reception of communications indicating a master/slave relationship between the plugins, such that a change in one plugin is reciprocated with a change in one or more slave plugins, as will be further described herein.

The process then proceeds to determine whether a change in one of the progression maps is detected 150 and effectuating a corresponding change in the other progression map 160. For example, if a change in the chord is detected, then a corresponding change to any other linked progression map, in this case a melody progression map, will be changed in an equivalent manner. This will be further described throughout the specification.

Chord and key may be selected from a plurality of chords and keys. In one example, as further illustrated in FIG. 2, a music writer/composer may select from any 12 keys along with either a major or minor key. Accordingly, a composer may start off composing a musical piece with at least 24 potential key and scale combination that will impact the overall tone of the entire music piece.

Upon receiving the key and scale selection, the musical plugin operating on a device, as further described herein, may build a corresponding chord progression sequence based on the selected chord. A chord progression sequence may be a succession of two or more chords used in a piece of music and determine how a piece of music unfolds over time. Accordingly, upon receiving the key and scale selection the output chord progression sequence includes a variety of potential chord progressions with established relationships between the chords that may be used in the writing of the musical piece, as will be further described herein.

The music writer/composer may elect to make modifications to the chords or leave them as suggested by the output chord progression sequence. In one example, the music writer/composer may elect to modify a single chord or a group of chords without it affecting the overall progression. In another example, modifying a single chord or a group of chords may affect progression of various subsequent chords. Accordingly, the plugin may adjust subsequent chords based on changes made to an earlier chord in order to keep a musical piece in harmony. This is relevant to music writers/composers and DJs.

As part of a composition of a musical piece, a writer/composer may wish to add melodies to the chords that are selected. Accordingly, melodies may be added to the composer's established chord progression sequence. In one example, the chord progression sequence may also be referred to as the chord plugin and the terms may be used interchangeably hereinafter. Similarly, a melody progression sequence may be referred to as a melody plugin and the terms may be used interchangeably. The same goes for a bass progression sequence being referred to as a bass plugin and the like. According to implementations of the present disclosure, the term plugin denotes a progression map that is linked with another progression map.

When a composer wishes to continue to compose a musical piece, the composer may select to add a melody progression sequence. As such, upon receiving the selection, the device may output a melody progression sequence that is already linked to the chord progression sequence. This means that the melody progression sequence is locked in with the chord progression sequence under the same key and scale selected by the user.

After generating the melody plugin, the user may then begin to modify the melodies within the melody plugin, as will be further described herein. Because of the two plugins being linked and are locked into the same key, any change in the melodies within the melody plugin will be mirrored in the chord plugin and vice versa. This advantageously allows composers, to compose musical pieces with interlinked chords and melodies that provide harmonic musical pieces. This also provides a time saving exercise as composer would be able to effectuate corresponding changes between chords, melodies and bass-lines as will be further discussed.

Of note is that the linked plugins are linked to more than just the key and scale. They also share knowledge of the actual sequence of chord changes. This is because melodies and basslines are automatically adjusted to accommodate changes in one or more chords, even when key and scale remain constant. For each chord "segment" in a sequence, the corresponding melody/bass plugins know the root note, triad type, etc., of the chord and adjust themselves accordingly. Accordingly, Melody, Deep and other plugins may be driven by changes to the properties of the chords plugin, which, in this instance would be the master plugin. Additionally, linked plugins can exchange all required information between each other. For example, even if key and scale differ, chords (actual notes in Chord plugin, properties of each chord-segment, etc.) could be shared.

Furthermore, it is possible to change the key/scale of the melody plugin independently of the chords. For example, a composer can play C Major in the chords, and play the relative minor key of A Minor in the melody. This can create enhanced effects, while leaving the plugins synchronized. This is also helpful for a user because it can provide visualization of when chords and other plugins clash, thus providing a cue to the user to modify the musical piece. Accordingly, in one aspect of the present disclosure, the "tension" is useful for such cases, because using different key/scale for chords and key/scale for melody will cause more tension than normal, and tracking and manipulating the tension will be key to composing harmonious, synchronized, and enhanced musical pieces. In one example, once the link is established all properties of each instance are available for connected instances, which may be an instance/id of a plugin. Once they (e.g. master/slave or chords/melody, etc.) are connected, they exchange all their data. While chords data is the portrayed as the present example, it is possible for other types of data to be portrayed and shared as well.

Figure 2:
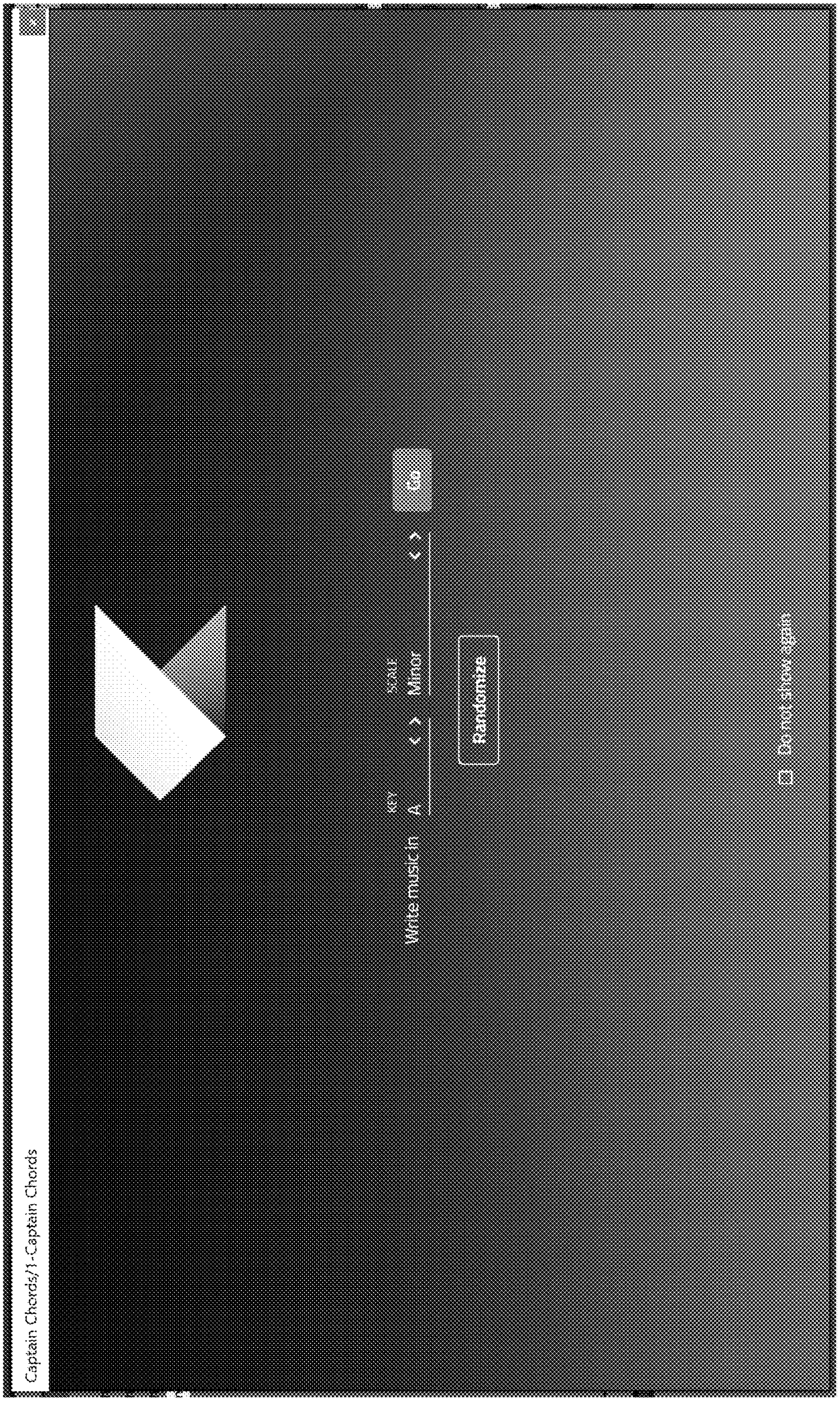
FIG. 2 illustrates an example of a key and scale selection process in writing a musical piece, according to one embodiment.

FIG. 2 illustrates an instruction page that is prompted upon the opening of the chord plugin. Before selecting and manipulating chords, a composer may be prompted to write music in a particular key and scale. As previously discussed, a user may select one of 12 keys and in either a major or minor scale, thus having at least 24 options to begin composing a musical piece. In yet another embodiment, a plurality of other supported scale types includes: Major, Major Pentatonic, Minor, Minor Pentatonic, Blues Major, Blues Minor, Mixolydian, Dorian, Lydian, Phrygian, Locrian, Harmonic Minor, Melodic Minor, Super Locrian, Hungarian Minor, Minor Gypsy and Bhairav.

Once the music writer/composer selects the key and scale, a chords progression sequence based on the selected key and scale is generated and displayed for the user. In this state, the user generates the sequence. In one example, the user sequence may be user controlled or may be randomly generated by the device based on some external input (for example, if a melody that a user wants to generate chords for already exists). In another example, the device may generate a chord progression from a list of valid presets/rules.

Figure 3:
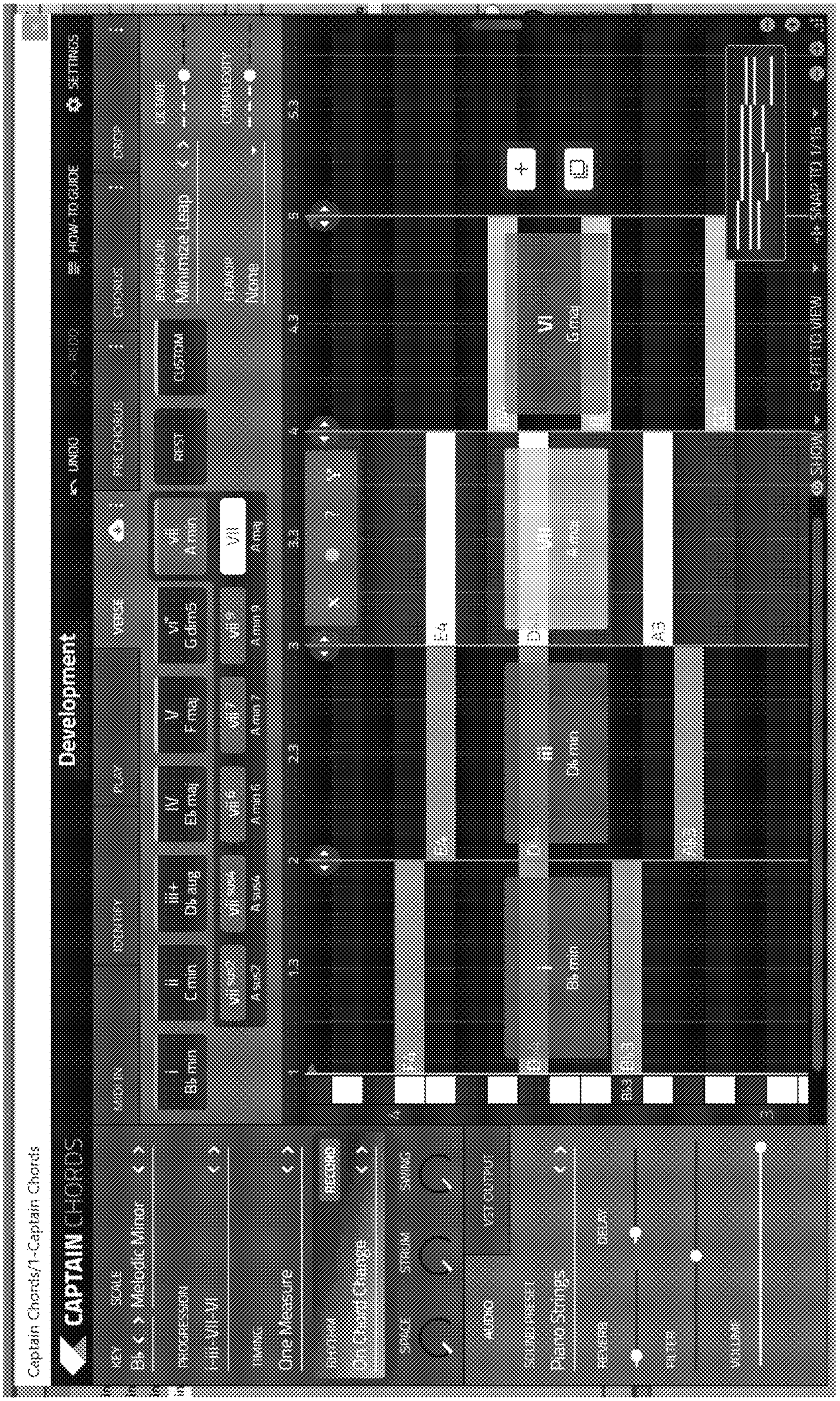
FIG. 3 illustrates an example of a chord progression sequence (plugin) according to one embodiment.

FIG. 3 is an illustration of a music composition chord progression sequence that displays a generated chord progression sequence based on user selection and enables musical piece generation based on a variety of settings as will be described herein. Chord plugin 300 displays the key and scale 302 that have been selected and a plurality of composition and manipulation option windows.

Figure 15:
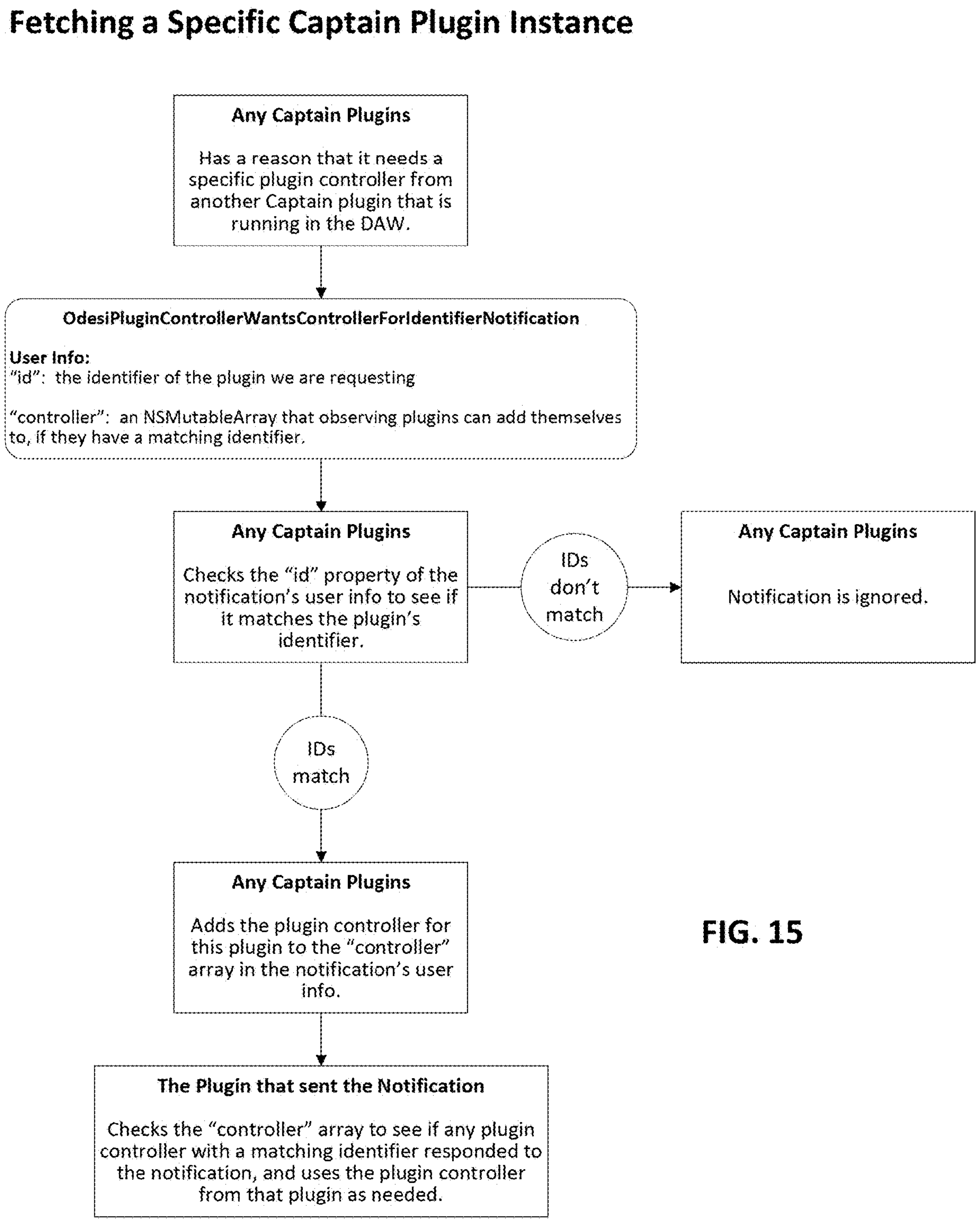
FIG. 15 illustrates a computer system upon which embodiments of the present disclosure may be implemented.

As previously described, the chord plugin may be an audio unit (AU) or a virtual studio technology (VST) instrument plugin and may run on a computing device as that described in FIG. 15. The computing device may also run a digital audio workstation (DAW) platform to incorporate the music piece generated using the plugin. While features of the present disclosure may include plugins that are used with AU and DAW platforms, the synchronization and tension manipulation described herein may be incorporated as part of the DAW platform itself (or even a VST) such that it is built into the DAW and a user would not necessarily need to open a plugin in order to create the above-described progression sequences.

If a composer is unsure of which key and scale to use, then a composer may consider running trials based on whether they are composing chords to match a vocal piece they intend to use, or any other pitched elements that may already exist in an existing project. This is because most elements within a musical recording will be comprised of various pitches or notes which fall within a set key and scale, by ensuring the song's key and scale match these pitches, the composer can ensure all elements in the song will be harmonically compatible. Such synchronization between the chord, key and scale, and other musical pieces that the composer wishes to use, such as melodies and bass-lines, will all be synchronized to the same key and scale to ensure harmonic compatibility.

In yet another example, if the composer does not wish to perform test trials or is unsure of how to match the vocal piece with the key and scale, the composer may select a random key and scale and may then incorporate the vocal piece within the chord plugin. The chord plugin will then automatically detect the key and scale of the vocal piece by converting the piece into traditional musical terms using a harmonic mixing guide.

Upon generation, the chord plugin provides a plurality of modification options for a composer to manipulate the chord progression. For example, a composer does not need to generate a suitable rhythm for the selected chord progression as numerous preset rhythms are available within the chord plugin. A composer may also apply their own custom rhythm to the chords that they record or create themselves. The composer may elect to use arrow keys to scan through various presets or click on a preset name under a menu name such as rhythm, note length, inversion, octave, flavour, complexity, and the like.

Figure 4:
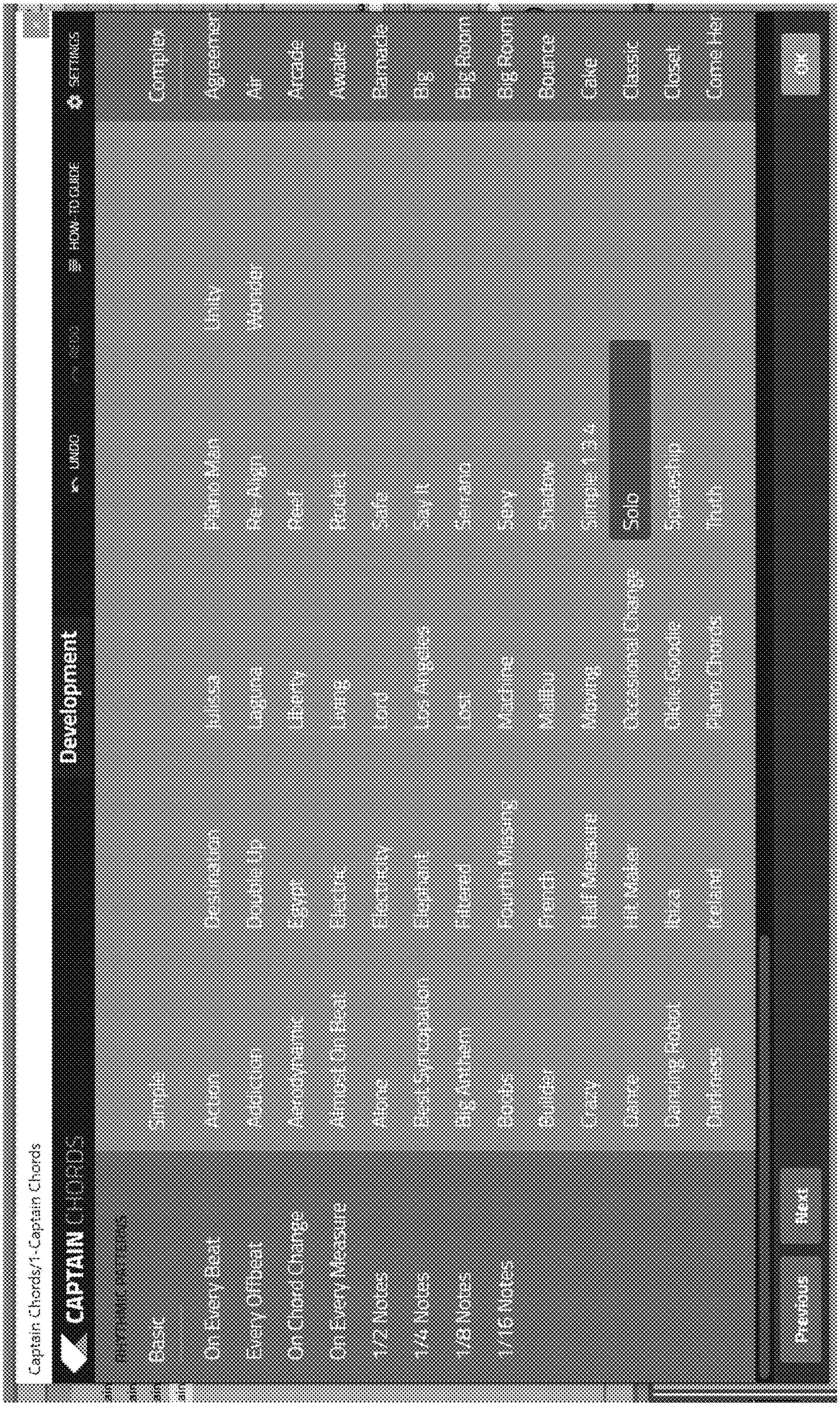
FIG. 4 illustrates examples of preset rhythms for modifying the chord progression sequence according to one embodiment.
Figure 5:
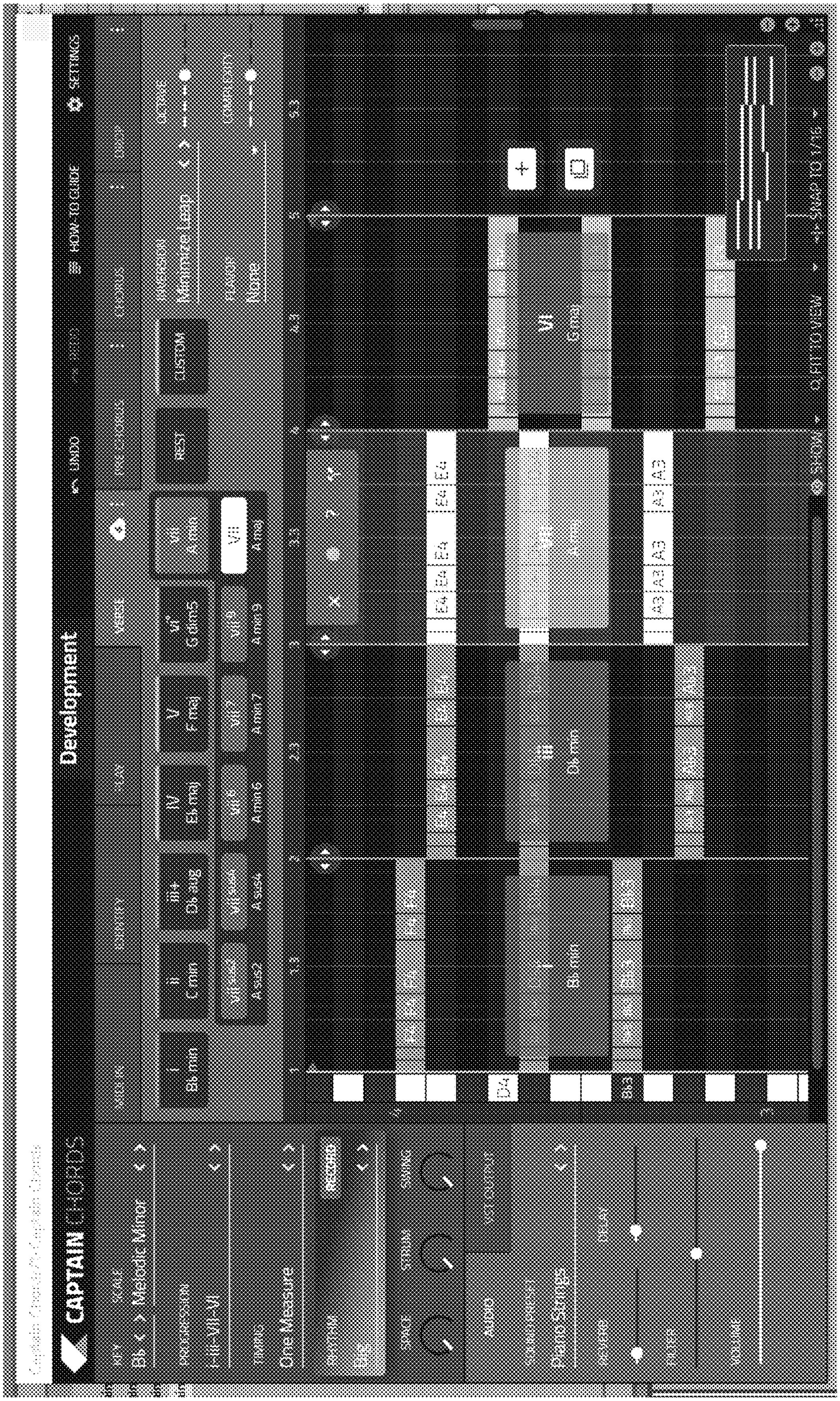
FIG. 5 illustrates a modified rhythm for each chord within the chord progression sequence according to one embodiment.

In one example, as described in FIG. 4, there are numerous presets build-in to the chords plugin. By clicking on the scroll bar option within the rhythm browser for example, the composer may be able to select different rhythms that may also be deployed every offbeat, on chord change, on every beat or on every measure. Additionally, the composer may also adjust the length of the notes which make up the chord. For example, when composing chords to pair with vocals, it is often easier to use long legato notes initially, adding a more complex rhythm later and reducing clutter of the composed musical piece initially. This allows a listener to hear more easily where the chord changes should occur, relative to the vocal. The chord plugin allows a composer to do just that.

A composer may also adjust sound presets and effects. For example, the chords plugin includes a large selection of sound presets, suitable for many genres. For example, sound presets may be organized to include categories such as plucks, bass, keys, leads, pads, strings, voices, and guitars. To add extra depth and character to a selected sound, options such as reverb, delay and filter may be applied. The system also supports Strum, Swing, and Humanization effectors. For example, both reverb and delay effects have several time and space settings to fine tune the effect to the composer's requirements. The filter provides an option to conduct high-pass or low-pass filtering.

Chord progression presets are included to aid creativeness. The composer may click on a drop down menu to open up the full browser or use the arrow keys to quickly scan through the various presets. The first chord in the key and scale denoted by (i) with the following chords also in roman numerals denoted by their position within the key and scale.

To further aid the arrangement of the musical piece, the chords plugin features grouping tabs located at the top of the user interface (other locations may also be utilized). These tabs allow the composer to compose separate chord progressions for each section of the song: verse, pre chorus, chorus, and drop. In doing so, a composer may only need to open a single instance of the chords plugin in order to compose all the parts of the music piece. When adding another plugin, as will be further described herein, the tabs of the chords plugin will communicate with the partner tables within the other plugins. This means that the other plugins will use the relevant chord progression from the chord plugin in order to write the bassline and melody, for example. As will be further described herein, when something changes in a property of a master plugin, all connected plugins are notified about the change in relation to their equivalent property.

An advanced composer may wish to edit the chords to add more complexity to the musical piece being produced. As such, a composer may either input or edit chords in the verse, pre chorus, chorus and drop tabs. The edit options include editing the length of the chord, splitting the cords, deleting, changing and placing rest gaps between the chords. In doing so, this offers the option of creating your own chord rhythms and progressions that either build on or deviate from the selected chord progression. The plugin allows a composer to input custom chords by typing their name, such as "Cmaj7" or by typing the scale degree, e.g. "III". The plugin also allows a composer to convert the custom chord to the correct chord for the given key and scale.

Additionally, in one example, users may be allowed to play notes directly into the software from a hardware instrument ("MIDI Controller" or "MIDI Keyboard"), and detect the chord being played in real-time. The detected chord is stored in the same transposable manner as other "generated" chords, and is such able to automatically update when the key or scale are changed.

Additionally, to enable easier chord editing, a piano-roll interface may be displayed in an interposed manner on top of the chord plugin. The piano-roll interface can be zoomed in or out, and changed to different view.

The chord plugin includes advanced chord settings to add additional character to the chord progression. These include inversion, octave, flavour and complexity. The "Flavour" and "Complexity" controls together work to effectively define what is known as the chord's "Voicing", a music theory term which refers to the chosen simultaneous vertical placement of notes of a chord. The plugin further includes tools (not shown) that can assist a composer to compose voicings. In one example, inversion automatically re-arranges the order of the notes within each chord ($1^{st}$, $2^{nd}$ inversion), and can also be useful to overcome large, unnatural movements between adjacent chords (minimized leap). By changing the inversion, a composer may also give the chord a different feel. The octave option will change the octave in which the chords are played. This will make the chord higher or lower pitched, whilst remaining in the same key.

Flavour adds additional, extended notes to the selected chord. These additional notes are named by the distance from the root note of the chord, and include $6^{th}$, $7^{th}$, $9^{th}$, $11^{th}$ and $13^{th}$ notes. These extended notes can be added individually or all at once. As the name suggests, flavour will add a unique flavour to the chord and can help create a more exotic sound, which can be useful to tailor the sound to the composer's chosen genre. The complexity setting adds additional notes on octave below the original chords. This helps to add weight and thickness to the chords' timber. It should be noted that fuller chords will take up more space in the frequency spectrum, so care should be taken when applying complexity, as it can result in more EQ application being required later in the project, in order to make room for other instruments. Selections may be made from 1-7, 7 being the most complex level.

In one example, the chord, rhyme, beat, play and other plugins may comprise a suite of plugins that are built on the principle that music should not be made in isolation. Every plugin, for example, can communicate with each other. This can happen inside or outside of a DAW platform. A chords plugin, for example, can send data to a melody and/or deep plugin (will be further discussed herein) and may communicate with the DAW using MIDI. The plugins may communicate between each other using specialized set of data that includes more metadata than the simple note messages available in MIDI. This creates a collaborative experience when writing music, because making a change in one plugin will automatically transpose the change to other plugins. This creates an enormous time saving exercise, and allows for composers to create music on a far more intelligent and less complex manner. It also enables professional composers to synchronize all their music composition environments such that their creative changes in one environment (e.g. chords, or rhythms) are communicated with and mirrored in other environments. This means that the system (computing device running the plugin) computes and generates equivalency between the different plugins such that changes in one plugin correspond to equivalent changes in other plugins, which are automatically generated using a harmonic tension engine as will be further described herein.

An additional benefit of the plugin connection and synchronization is the ability to simplify the workspace for music composition. For example a composer does not need to have multiple instruments and windows open and work around to match harmonies between chords and melodies for example. When a plugin detects another active plugin, an automatic synchronization occurs or the composer is presented with an option to choose to synchronize between the plugins. In either case, this allows a user to remain composing within a singular environment knowing that his composition modifications are being adapted to other aspects of the musical piece. This also improves the quality of the interface (graphical user interface or GUI) because in this case the GUI does not have to support multiple environments to be open in order to track and record a piece being composed. This also allows for a reduction in processing speed required of the computing device running the plugin.

How the Plugins Connect to Each Other:

In an exemplary embodiment, plugin binaries are built according to the VST format, which specifies an "entry point" into an executable program. The DAW hosts the plugins in a single process, which may be the DAW's main process or a dedicated plugin process—but plugins are grouped in the same process. This is what enables the plugin communication—because all the plugins run in the same computer process, and share memory. This is done by the DAW automatically. An exemplary mechanism for orchestrating the many instances of the plugins is as follows:

The first instance of the plugin to be instantiated by the DAW will perform its one-time initialization and initiate the running program that controls the orchestration of all subsequent plugin instances. In essence, this is the only program that ever runs. Every subsequent instance of the plugin is another window with its own user interface and corresponding MIDI channel routing in the DAW, but they are all run by one program.

Figure 6:
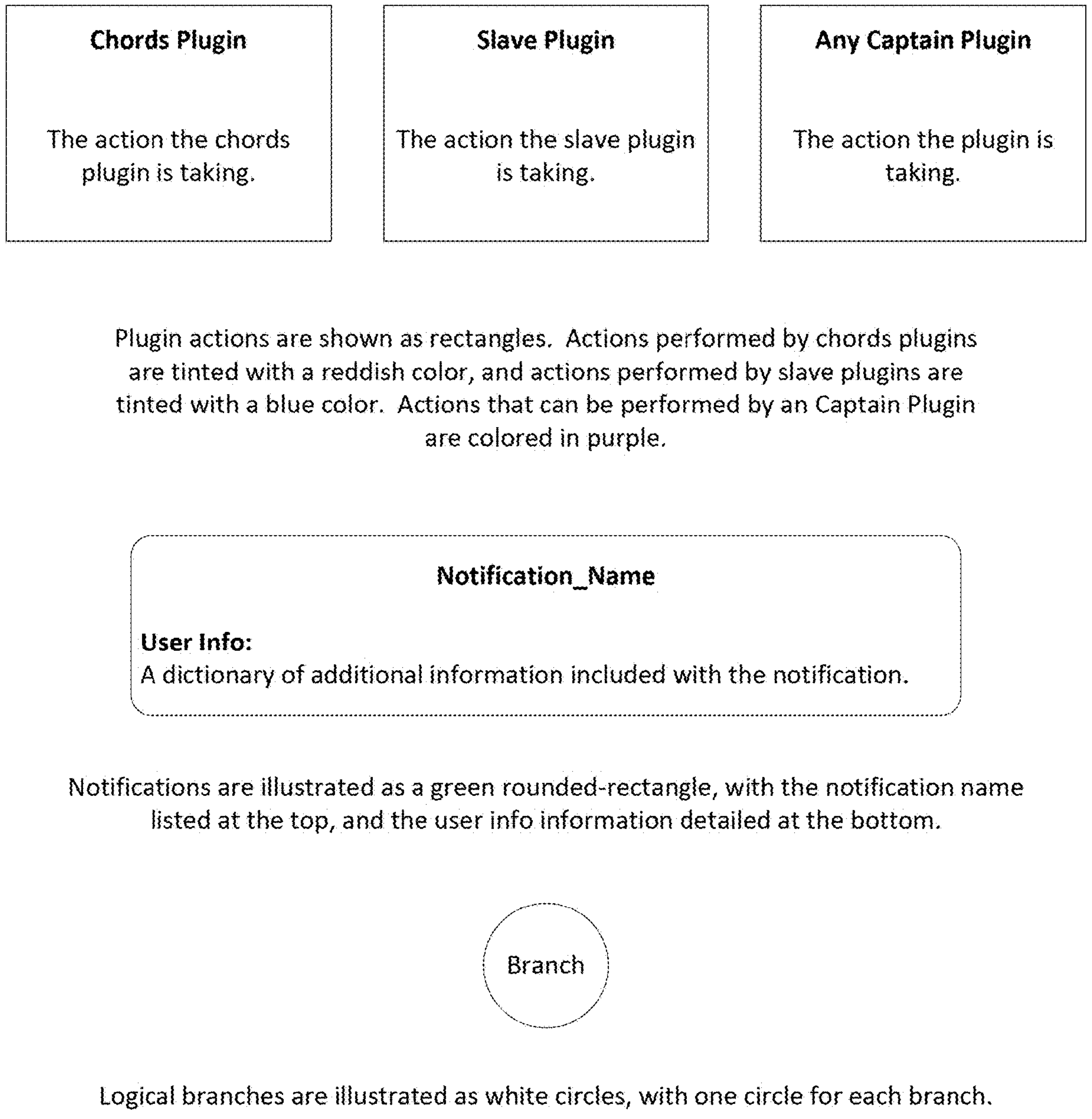
FIG. 6 illustrates an example melody progression sequence that mirrors the chord progression sequence according to one embodiment.

The program groups plugins into classifications of "master" or "slave" as illustrated in FIGS. 6-16. As shown in FIG. 6, plugins are defined as either master or slave plugins, but not both (Chords plugins are considered master plugins and cannot be slaved to other Chords plugins, for example). Plugin instances are then grouped into plugin groups. Each plugin group consists of zero or one master plugins and zero or many slave plugins. In this way, one or more slave plugins can operate autonomously without a master plugin; accordingly, master plugins can operate autonomously without any attached slaves. Accordingly, it is possible for any plugin to connect to others, and the flow of information can be directed both ways (i.e. master→slave, or slave→master).

Groups are by default assigned automatically according to the rules outlined: when slave plugins are added to a song/musical piece, they are automatically attached to the most recently added running master plugin (if any), or they operate autonomously. When master plugins are added, they detect any autonomous slave plugins and immediately claim ownership of them, automatically creating a new group. Master plugins will function with zero or more slave plugins, such that all subsequently added slave plugins will automatically be added to the most recently created master plugin's group. There is also a feature to allow users to manually link and unlink plugins, reforming the plugin groupings as they see fit.

Once grouped, whether immediately on start-up (in the case when there is already a group formed that is accepting slaves, or a new master plugin is being added which will in turn create a new group) or when subsequent slave plugins are added to an existing group, the grouped plugins sync and agree on a shared set of data. The method by which the plugins agree on shared data at the time of grouping is as follows: If the group already contains a master plugin (and therefore already has an agreed-upon shared data set), the newly added plugins are simply assigned the already established shared data set. If there is no master plugin at the time of grouping, the new master plugin will create a shared data set based on the first connected slave plugin, using properties from the slave plugin that make sense to the entire group (key and scale, and any song section definitions such as Verse, Chorus, Pre Chorus, Drop and any custom titled song sections), combined with necessary defaults created on-the-fly, partially derived where possible from those settings provided by the existing slave plugin.

Once this grouping is complete, the plugins are linked until the corresponding slave or master plugins are removed, breaking the link. When a link is broken, the participating plugins each retain a copy of the shared data as it existed at the moment the link was broken, so they can continue to operate autonomously (but while no longer sharing data).

[How the Plugins Talk to Each Other/Share Data]

The plugins in a group are all actually part of a greater, single running program. As such, they share memory. When new plugin groups are formed, they agree on a shared plugin state according to the rules outlined above and place that shared state in a variable in memory. Each plugin in a group retains a pointer to that plugin group's shared state in memory for the entire lifetime of the plugin group. The program has code in place to intercept any changes to the shared plugin state and immediately notify all grouped plugins that some part of the shared state has changed. The grouped plugins immediately react to these changes according to their own logic (for example, the Melody plugin may regenerate the entire melody when the Key or Scale changes, but may opt to ignore changes to chord voicing/complexity/octave).

In one example, a user adds an instance of a chords plugin and creates a nice chord progression in the verse tab (can be referenced as chords1). Thereafter, the user adds an instance of another plugin, e.g., a deep plugin (can be referenced as deep1). The system prompts the user to link deep1 to chords1. If the user accepts, the system tracks that chords1 is a master and deep1 is a slave to chords 1. Thereafter, if the user changes the degree of the third chord in the verse tab of chords1, such changes are translated into deep1 as well. For example, the system looks for any slaves of chords 1, and in this case, finds deep1. Then it sends deep1 a message to update itself, passing it the new information from the chords1, including the updated degree of the third chord in the verse tab. Using the new information, deep1 performs the update based on the received information.

[What Information is Shared]

Plugin-Instance Shared Data:

Plugin ID (UUID)

Plugin group membership (master/slave relationship)

Song-Section Dependent Shared Data:

Key

Scale

Section title

Section duration

Strum preset and strum magnitude

Swing preset and swing intensity

Section's chord sequence, defined below.

Other settings chosen by the user, such as Rhythm preset, Timing preset, Shape, etc., can all be included in this shared section data.

Chord Sequence Shared Data:

Each chord's start and stop beat (chord change timings)

Each chord's transposable chord definition (degree(+offset) in scale, triad type, decorations, voicings, octave, inversions, additions, additional flavours, and custom chord name if provided).

As illustrated in FIG. 6 and as described herein, slaved plugins keep track of the identifier for the chords plugin they are tracking, and react appropriately when changes are made in that plugin as a result of notifications received from the master plugin. The chords plugin does not keep track of what plugins are synced to it. In one aspect, this top down design simplifies the algorithmic complexity and increases efficiency of the system by having each plugin have a defined and simple role within the group. This also allows for a program operating the plugins to utilize less computational bandwidth.

In one example, inter-plugin communication (communication between plugins) is done by taking advantage of the fact that all plugins running in an instance of a DAW share the same instance a notification message. This allows for the transmission of notifications using notification center from one plugin instance, and observe them in another. The notification center may act as an intermediary receiving information from each plugin and sharing information with each plugin based on the master/slave status of the plugin.

Figure 7:
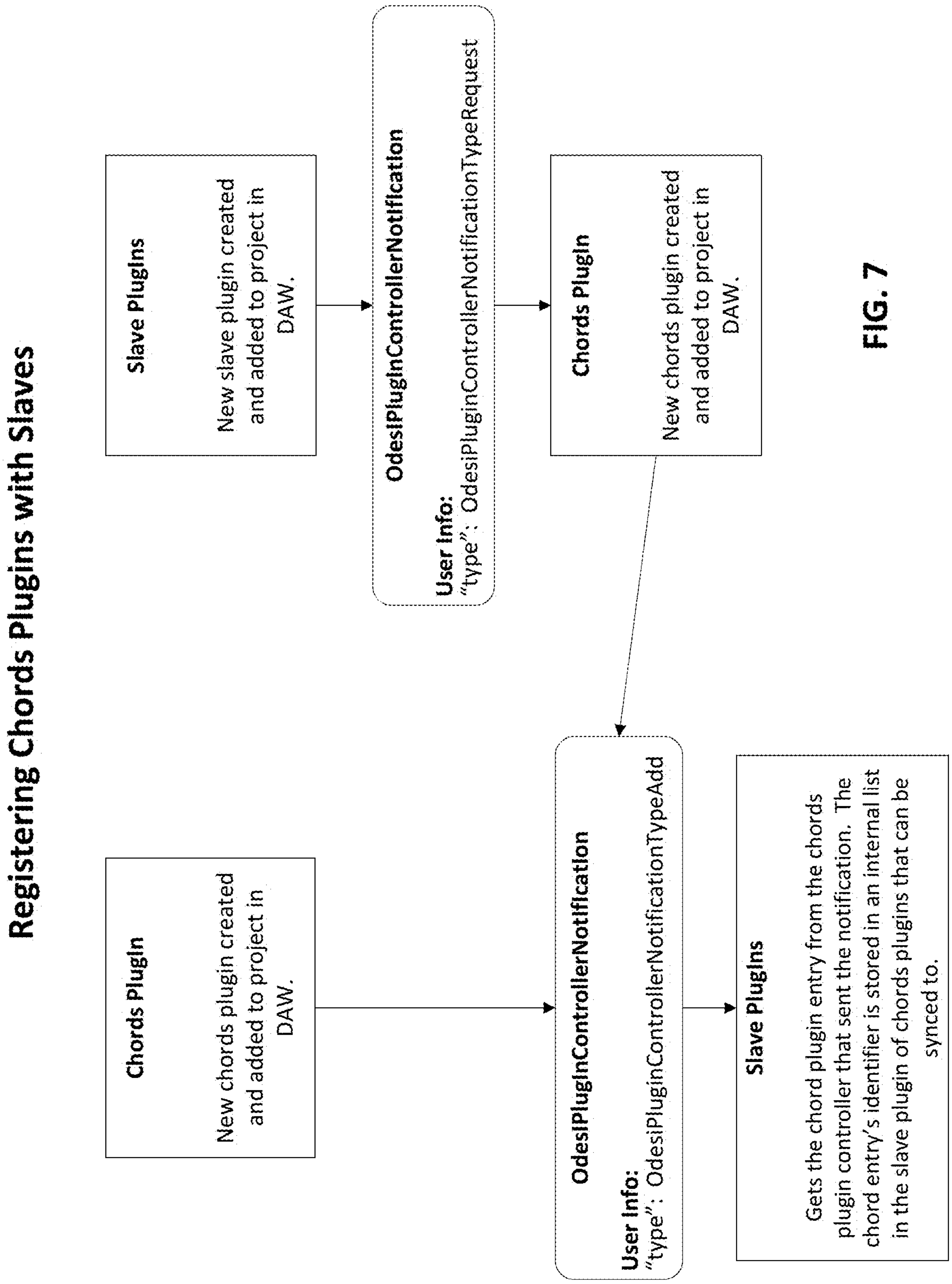
FIG. 7 illustrates an example of preset rhythms within the melody plugin according to one embodiment.

For example, FIG. 7 illustrates a method of registering chords plugins with slave plugins. Here, a chords plugin sends a notification that slave plugins observe, to let the slave plugins know that there is a new chords plugin available that can be synced to. This type of notification may be broadcast when a new chords plugin is created or when a new slave plugin requests that all currently open chords plugins send the notification again.

In this example, the chords plugin re-sends an add notification type to update all slaves including the brand new slave, with the chord plugin's availability. Thereafter, the slave plugin(s) receive the chord plugin entry from a chords plugin controller that sent the notification. The chord plugin entry's identifier is stored in an internal list in the slave plugin of chords plugins that can be synced to.

Figure 8:
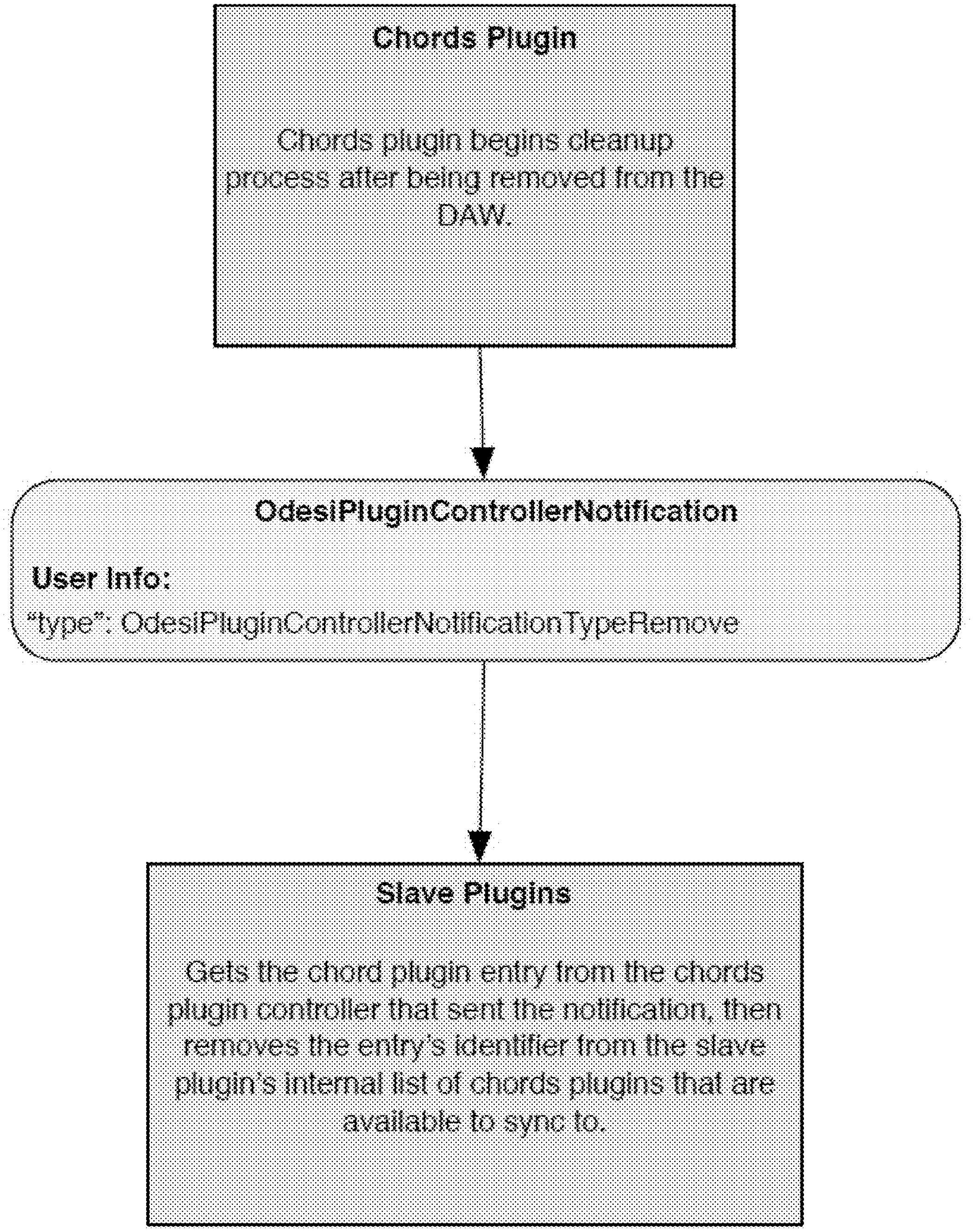
FIG. 8 illustrates an example of preset patterns within the melody plugin according to one embodiment.

FIG. 8 illustrates a method of removing a chords plugin. This happens when a chords plugin is removed from a track in the DAW, for example. In this case, the chords plugin transmits a notification to inform all slave plugins that the plugin will no longer be available to sync to. After being removed from the DAW, the chords plugin begins a clean-up process removing any data relating to the group that it was just removed from. Upon reception of the chord plugin entry from the chords plugin controller that sent the notification, each slave plugin removes the entry identifier from the slave plugin's internal list of chords plugins that are available to sync to.

Figure 9:
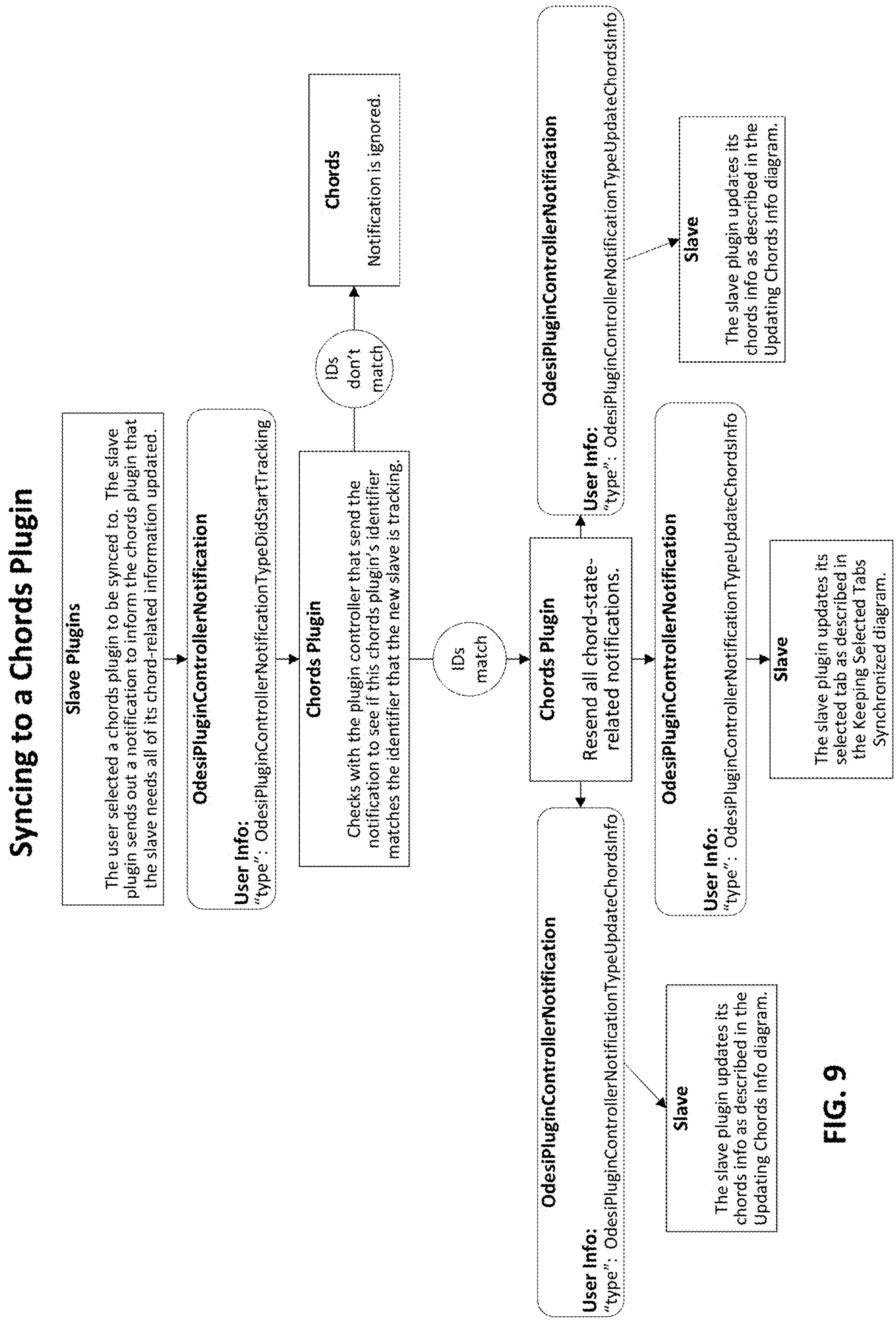
FIG. 9 illustrates a collaboration between a chords plugin and a melody plugin embedded within a digital audio workstation channel space according to one embodiment.

FIG. 9 illustrates when a slave plugin is first synced to a chords plugin. In this case, the slave plugin sends out a notification to let the chords plugin know that there is a new slave that needs its chord-related information. For example, when a composer selects a chords plugin to be synced to, the slave plugin sends out a notification to inform the chords plugin that the slave needs all of its chord-related information updated. In turn, the chords plugin checks with the plugin controller that sent the notification to see if the chords plugin identifier matches the identifier that the new slave is tracking. In a case where IDs do not match, the chords plugin ignores the notification. Alternatively, if the IDs match, the chords plugin sends all chord-state-related notifications. As a result, the slave plugin updates its chords information, as will be further described in FIG. 10 below. The slave plugin also updates its selected tab as described herein and updates its beat offset parameter as will also be further described herein.

Figure 10:
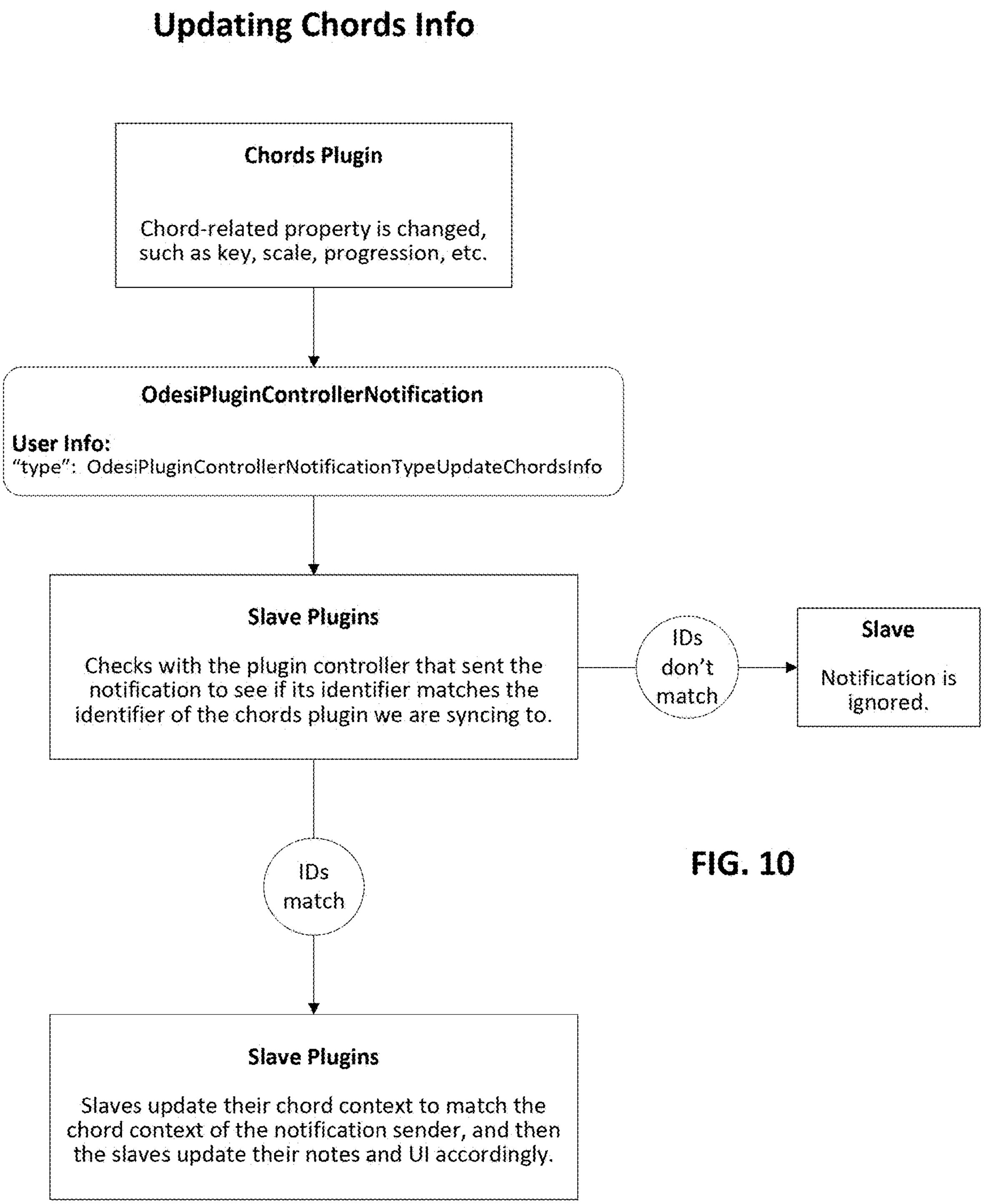
FIG. 10 illustrates a flow chart for creating a musical piece according to one embodiment.

FIG. 10 describes an updating method for updating chords information when chord-related properties change in the chords plugins, such as key, scale, chord progression, etc. In this case, a notification is sent out to all known slaves that they should update their content to match the new chord context.

For example, when a chords plugin detects that chord related property is changed, such as a key, scale, progression, etc., the chords plugin sends a notification to all known slaves. Upon receiving the notification, each slave then checks with the plugin controller that sent the notification to see if it its identifier matches the identifier of the chords plugin that it is currently synced to. If the IDs do not match, then the notification is ignored. If the IDs do match, then the slaves update their chord context to match the chord context of the notification sender and then the slaves update their notes and user interface (UI) accordingly.

This is yet another benefit of the plugin synchronization. By updating the UI based on changes performed in another plugin, the system updates UI settings, including layout and progression maps based on new changes that took place in another plugin. This enables the GUI to be more interactive, and to seamlessly update information and layout to correspond to a synchronized plugin.

Figure 11:
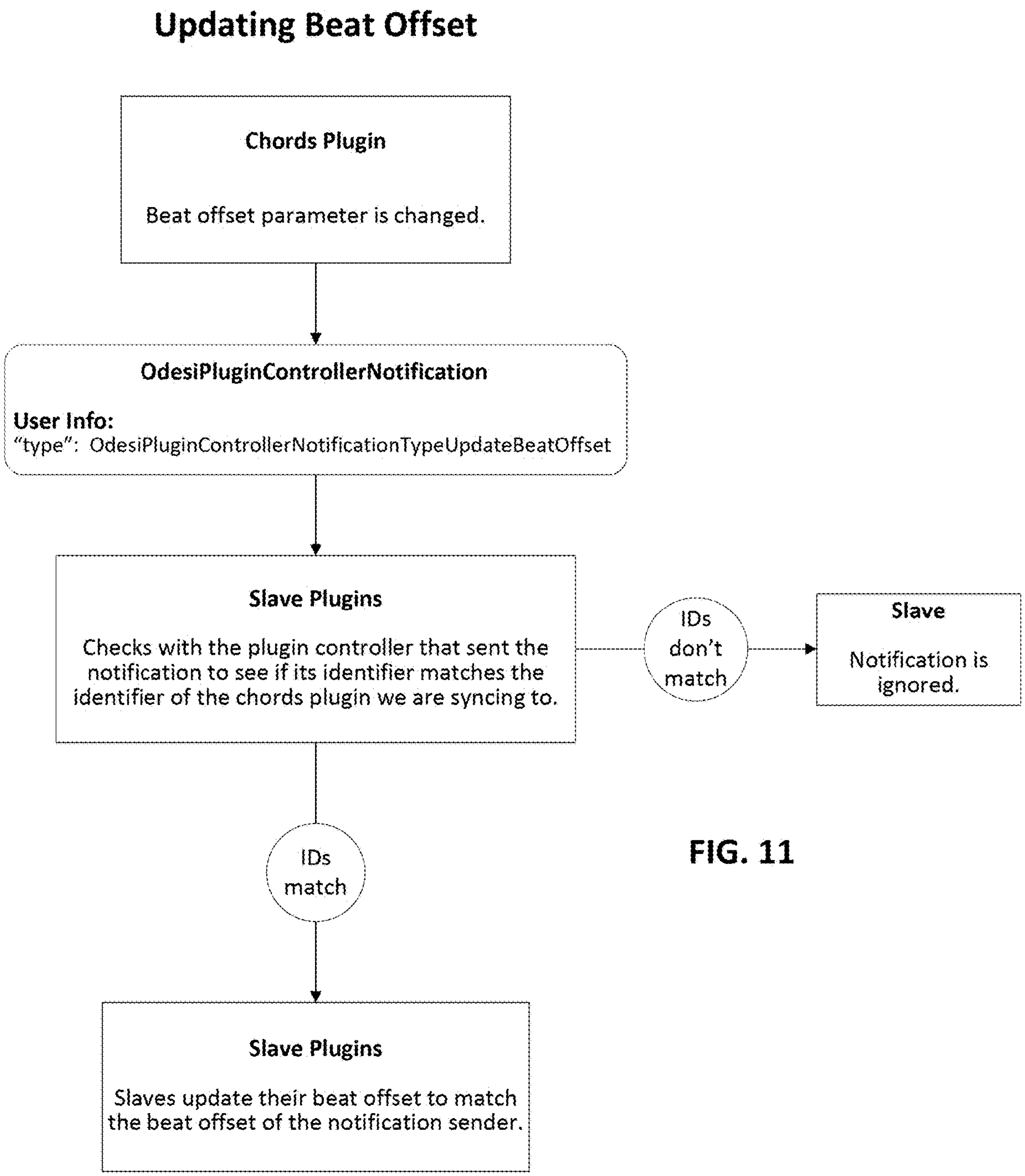
FIG. 11 illustrates a bassline plugin linked to a chord plugin according to one embodiment.

FIG. 11 illustrates a method of updating beat offset. The beat offset parameter allows the program to offset its looped notes by a certain number of beats. When this parameter is changed in a chords plugin, a notification is sent so that slaves can match the beat offset so the slave's notes properly align with the master's notes. This notification may also be sent out in response to the slave sending a notification requesting tracking information and requesting updates. Accordingly, after the chords plugin transmits the notification, each slave plugin checks with the plugin controller that sent the notification to see if its identifier matches the identifier of the chords plugin it is trying to sync to. If the IDs do not match, then the notification is ignored. If they IDs match, then the slave plugin updates its beat offset to match the beat offset of the notification sender.

Figure 12:
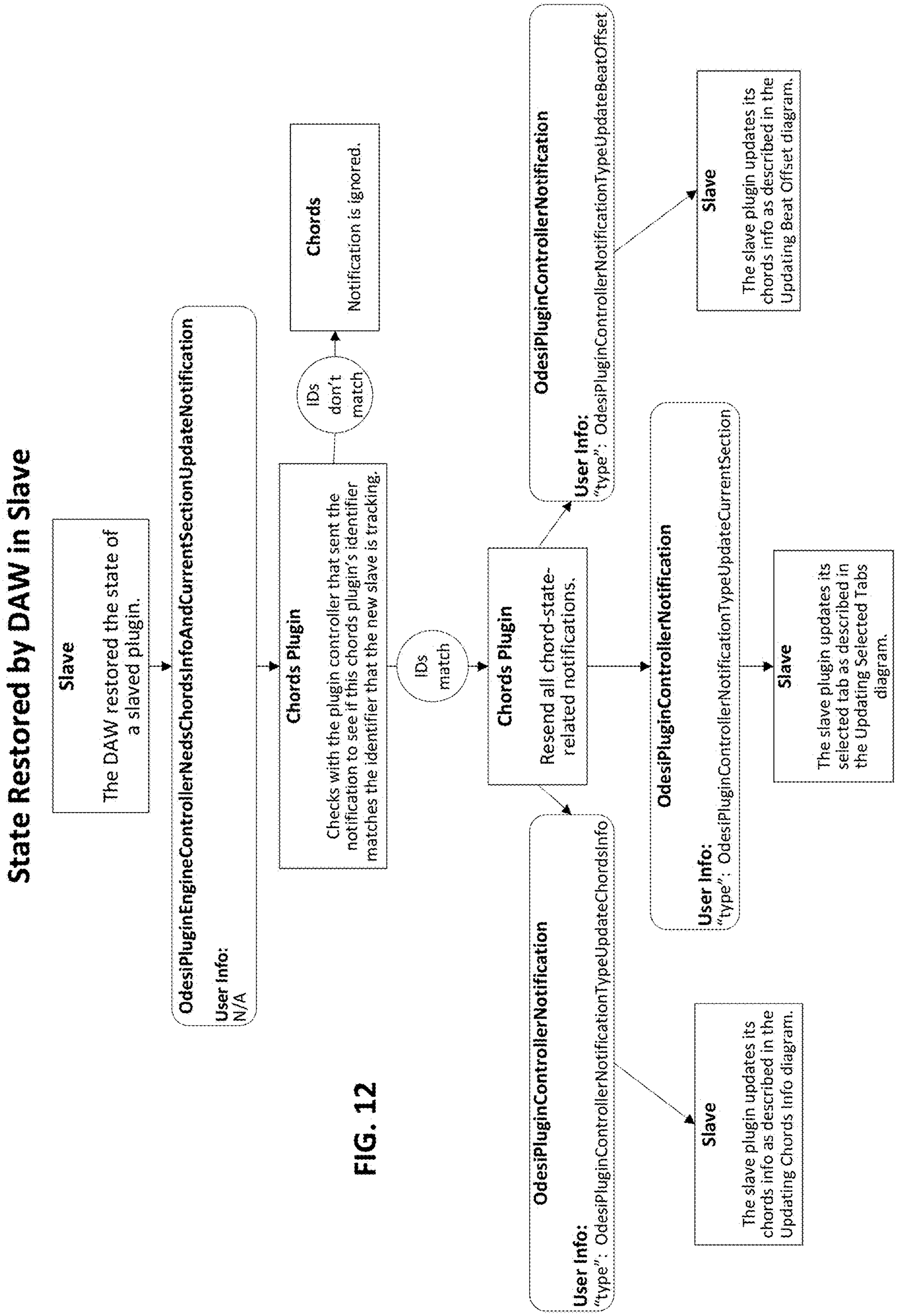
FIG. 12 illustrates preset rhythms within the bassline plugin according to one embodiment.

FIG. 12 illustrates a state restored by DAW in a slave plugin. When a DAW sets a preset on a plugin, it does so using the plugin's state restoration mechanism. After state has been restored in a slave, the slave sends a notification to let its synched chords plugin know that there is slave that needs its chord information updated. Here, the chords plugin checks with the plugin controller that sent the notification to see if the chords plugin's identification matches the identifier that the new slave is tracking. If no match, then the notification is ignored. If the IDs match, the chords plugin resents all chord-state related notifications.

In turn, the slaves update plugin information according to the update chords method, the update selected tabs method, and update beat offset diagram method.

Figure 13:
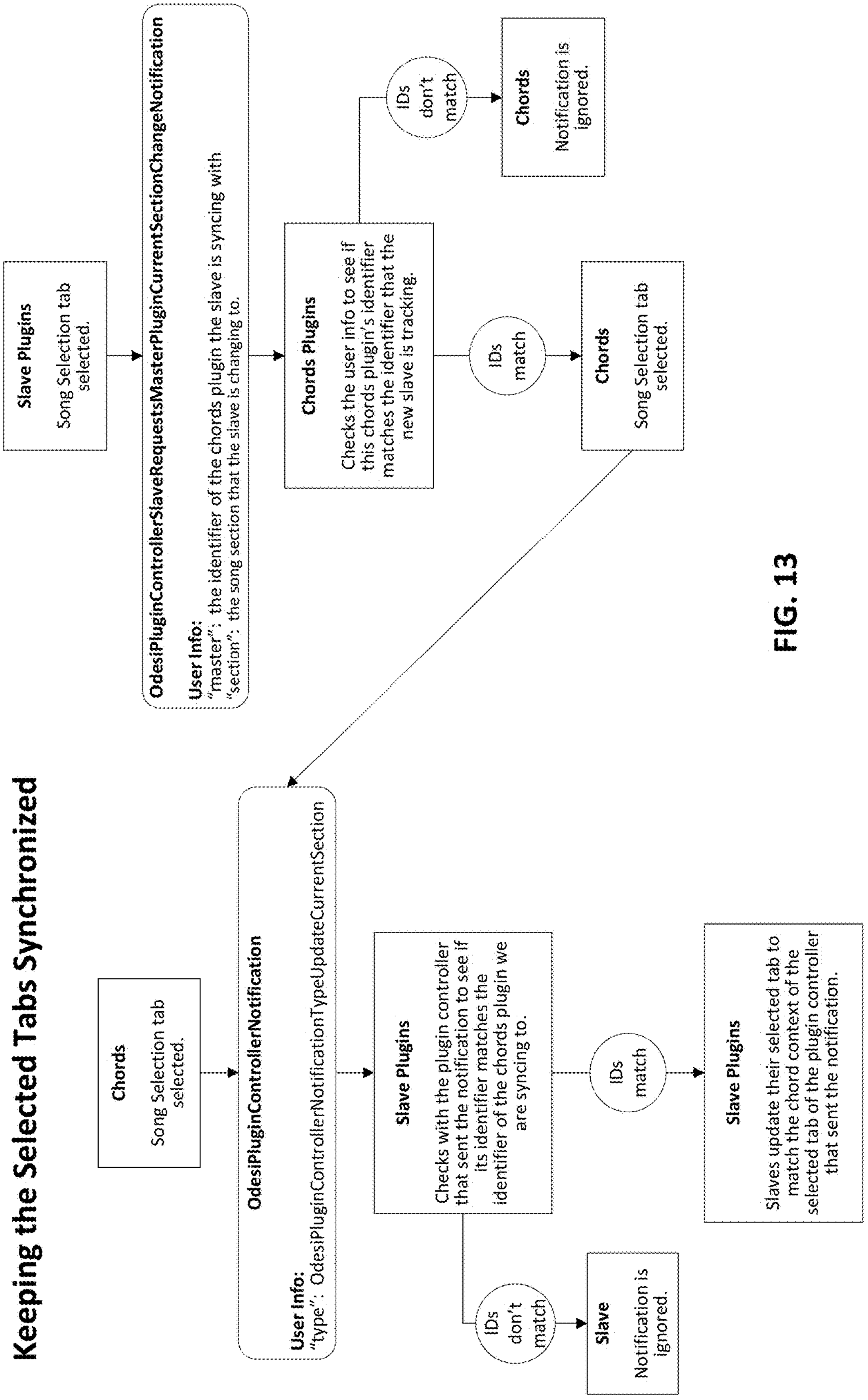
FIG. 13 illustrates collaboration between a linked bassline plugin and a chord plugin according to one embodiment.

In yet another embodiment, FIG. 13 describes keeping the selected tabs synchronized. When the selected tab of a chords plugin is changed to any of the song section tabs (verse, Pre-chorus, chorus, or drop), the plugin sends out a notification so that all slaves can also update to that same tab. Similarly, when a song section tab is selected in a slave plugin, the slave plugin sends out a notification for its master to also update its selected tab, which in turn causes all connected slaves to be updated. The chords plugin also sends this notification in response to the slave sending a notification indicating start of tracking and/or update notification.

Figure 14:
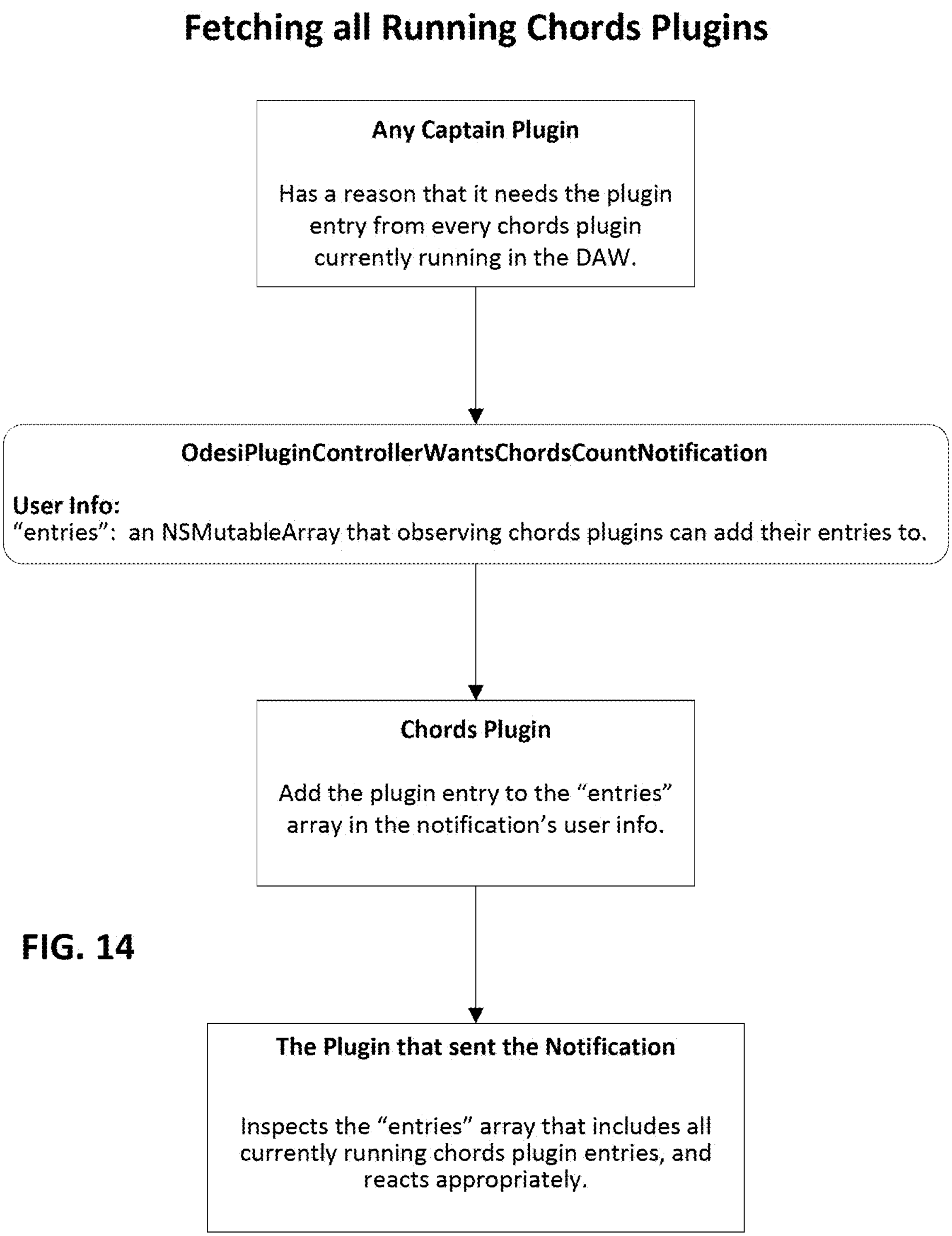
FIG. 14 illustrates a keyboard arrangement for live chord composition within the selected key and scale according to an embodiment.

In yet another example, there may be a need to fetch all running chords plugins as described in FIG. 14, that are running in the DAW. Of note, is that when a chord plugin is created, it needs to check for the existence of other running chords plugins so it can name itself accordingly. Furthermore, when a chords plugin has its state restored, the plugin must check with all other plugins to see if this is a duplicated identifier as a result of duplicating a track in the DAW. If this is the case, a new unique identifier is assigned to the duplicated chords plugin. This is also useful such that when a new slave sequence/plugin is started, it can check if there are any master plugins running to determine how to synchronize itself accordingly. For example, a play sequence may start at the same tab as that of a master chord sequence.

FIG. 15 describes fetching a specific plugin instance. This is done by sending a notification with the identifier of the plugin being requested. This function may be used when a plugin is first launched and needs to set its key and scale to match the primary chords plugin's key in scale in the DAW. To do this, a list of chord plugin entries may be fetched, then this notification is used to fetch the first entry's plugin controller to match its key and scale.

Figure 16:
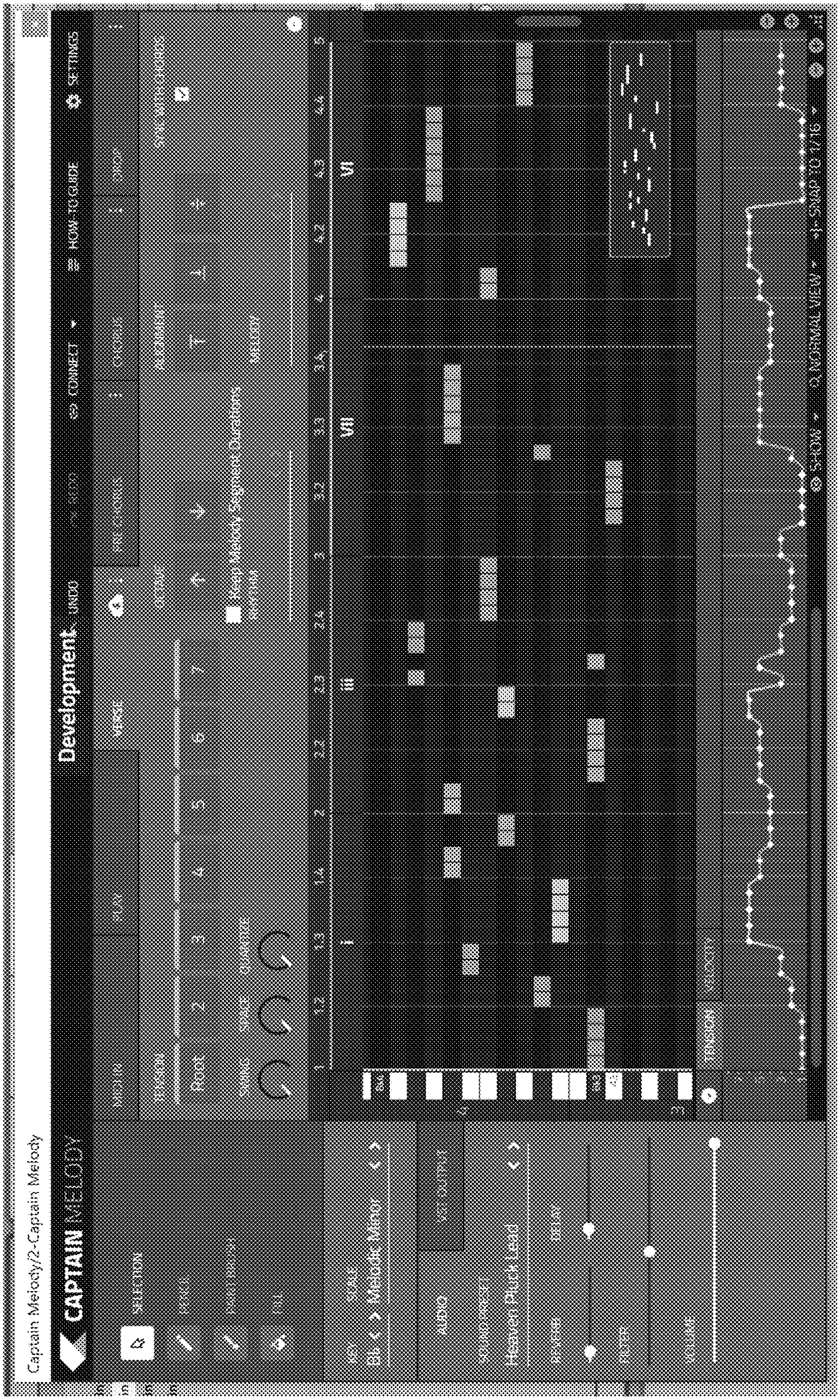
FIG. 16 illustrates an overview of the plugin structure according to an embodiment.

FIG. 16 provides an illustration of a melody plugin which automatically syncs with the chord progression sequence (plugin) that is created as described in FIGS. 6-15. In here, the connection between the plugins may be done directly/automatically, or may be done based on user request.

Similar to the chord plugin, the melody plugin allows a composer to compose the music piece and make specific edits that enhance the composed music piece. For example, octave, note length and tension may all be modified as best suits the composer. Similarly as before, the octave option may place the musical piece rhythm between the first and the seventh octave. A composer may also adjust the length of the notes from within five or more available note lengths. Composers may also modify tension parameters, which offers the addition of tension created through changing the notes within the melody to either: in harmony, in scale, chord notes only, or unmodified. When in harmony is selected, notes played back will be performed around notes which will harmonize with the chords and give a consonant feel with occasional dissonance. In scale notes played back will only be those which fall within the chosen key and scale. Chord notes only notes played back will be limited to those which the current chord contains. And unmodified setting will trigger the original, unmodified notes of the clip. A composer may also select from a wide array of rhythm and pattern. The melody plugin includes a list of rhythm presets to choose from and a list of preset patterns in which the melody is played. The pattern will retain the pre-selected rhythm; however, the order of the notes played will be changed.

Figure 17:
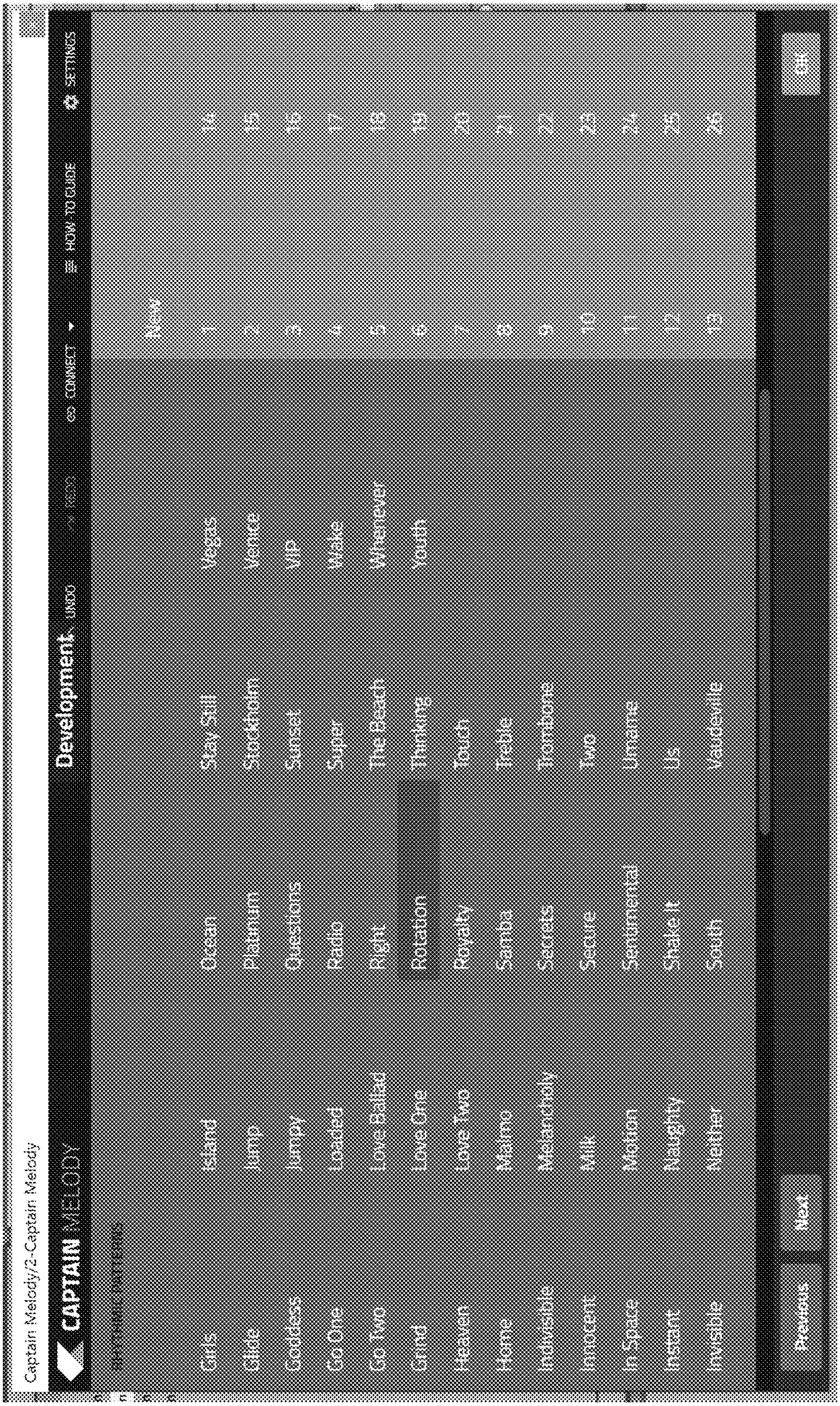
FIG. 17 illustrates a registration of a plugin with slave plugins according to an embodiment.
Figure 18:
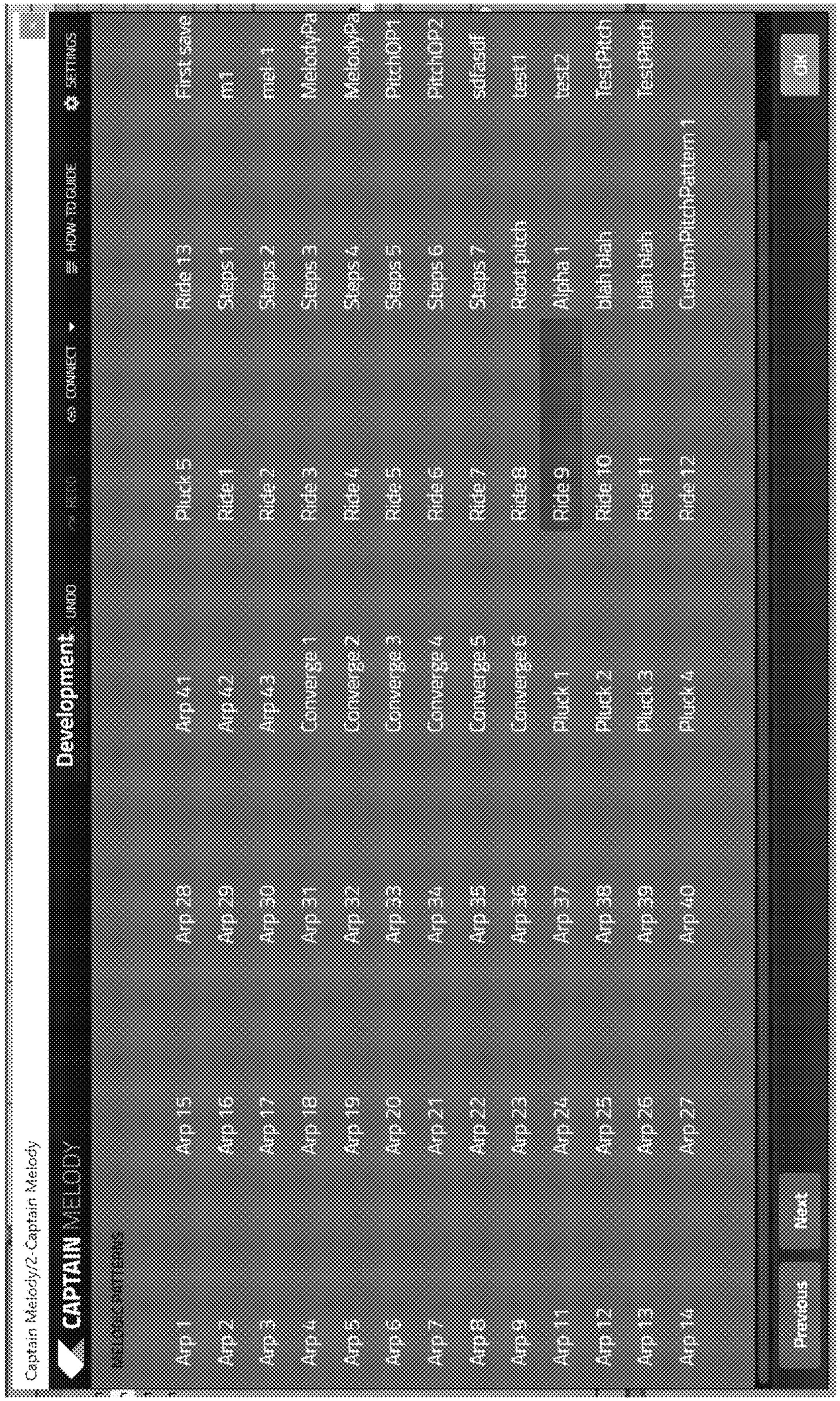
FIG. 18 illustrates removing the chords plugin from a track in a DAW according to an embodiment.

FIGS. 17 and 18 illustrate sample lists of preset rhythms and patterns that a composer may select from when composing melodies that are linked to the previously selected chords.

Figure 19:
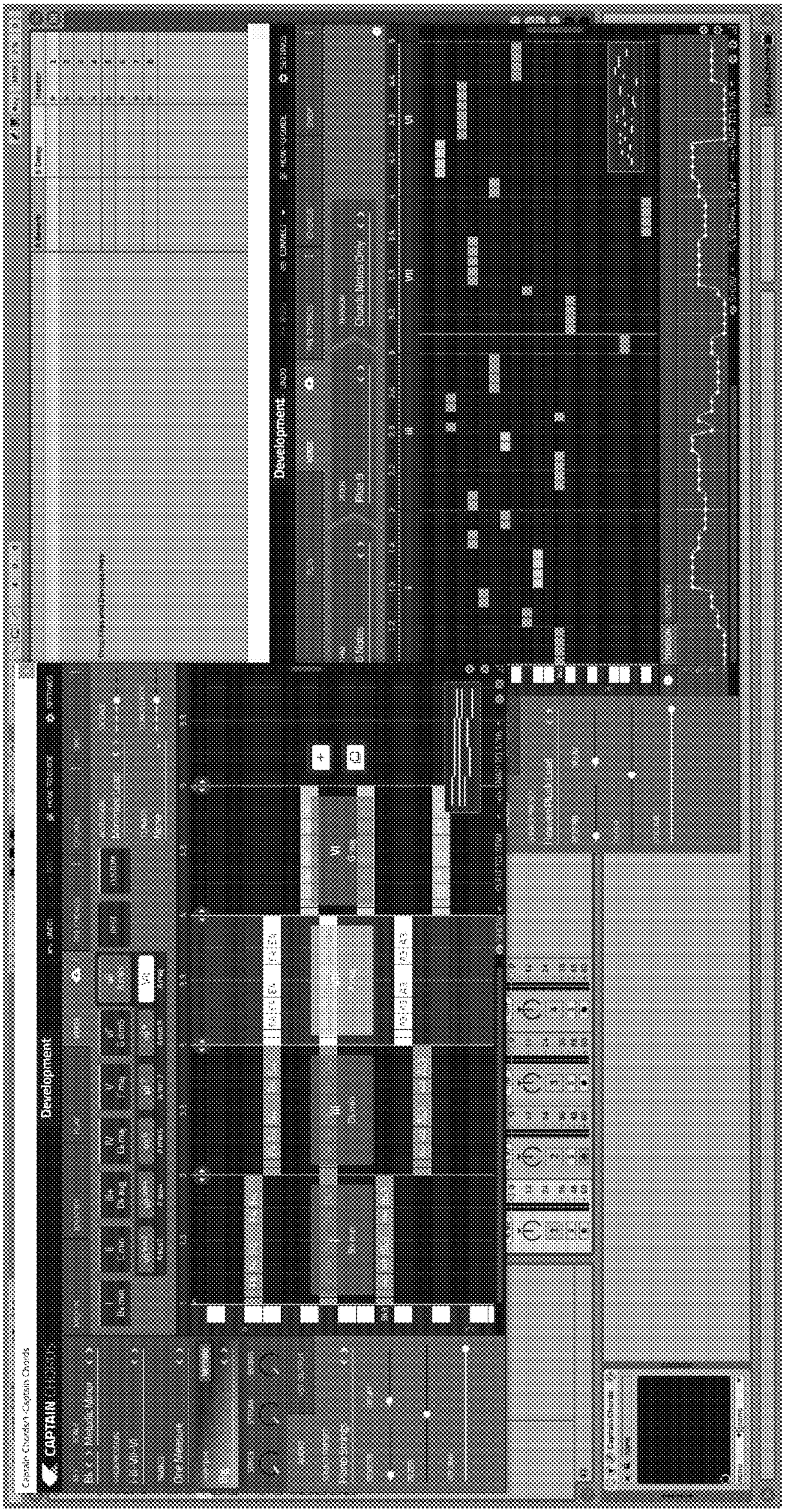
FIG. 19 illustrates syncing to a chords plugin according to an embodiment.

FIG. 19 illustrates one or more plugins that are open by a composer and are ready to export to a DAW workspace and/or channel. As can be seen in the figure, a chords plugin is opened and includes a specific chord progression based on an Eb Bhariv key and scale and a corresponding rhythmic progression sequence is provided to match the chord progression. These two plugins are provided and interact with a DAW workstation, such as Abelton Live. In one example, once the clip is completed in either one of the plugins, or in both, a composer may export the composed clip into a live channel within the DAW. The export may be done by dragging and dropping a clip window within each plugin into the respective channels. In one implementation, the composed progression sequence may be dragged and dropped into the composer's preferred DAW platform. However, other implementations may also be incorporated, including, for example, manipulation of the progression sequences within the DAW platform itself. As such, changes show up automatically in the DAW and would not need to be updated using a drag and drop option.

Figure 20:
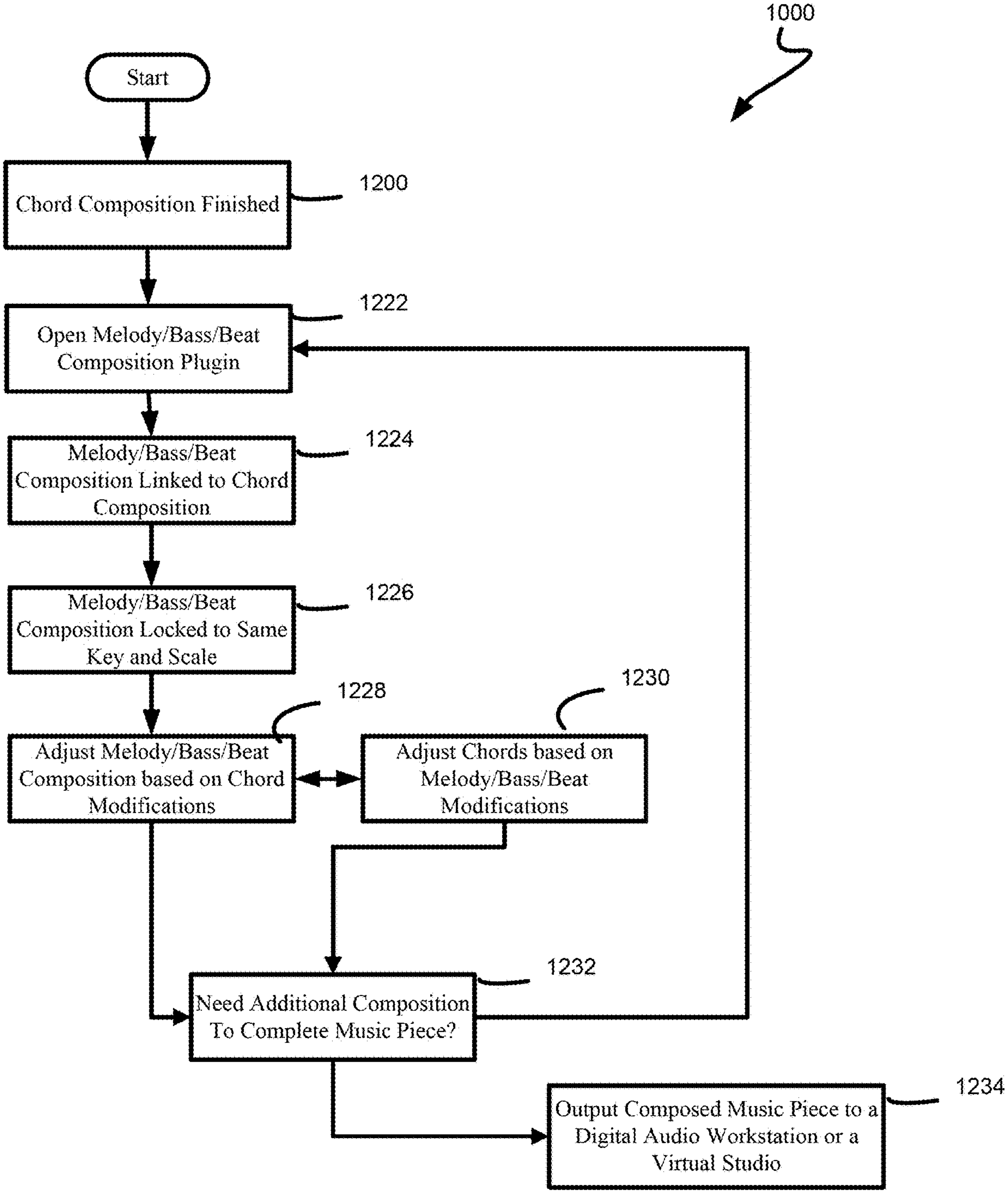
FIG. 20 illustrates updating chords information according to an embodiment.

FIG. 20 illustrates a flow diagram for music composition method 1000 that incorporates collaboration between plugins. In one embodiment, once a chord composition is finished 1200, a composer may open one or a plurality of complementary composition plugins 1222, such as a melody plugin, a bass plugin or a beat plugin. For exemplary purposes, a melody plugin may be used for illustration herein. A composer may select the rhythm composition plugin, from a DAW workstation, for example, and the melody plugin will be linked to the chord plugin 1224. In one regard, this means that the rhythm and the chord plugins are locked to the same key and scale 1226 and that adjustments in one plugin are mirrored in the other plugin automatically. The link between the plugin may not be limited to the key and scale lock, but may also include communication between the tabs of the plugin. For example, when a user makes adjustments to the rhythm of the chords plugin, this effectuates changes in the melody plugin as well, and melodies within the plugin are adjusted accordingly.

In one implementation, a user may avoid playing melody notes on the same gridlines as the chords, or avoid playing bass on the same gridlines as the kick drums. Alternatively, the user may do the opposite: play bass on the same gridlines as the kick for the extra "boom." A user can play melody on the same gridline as chords. Draw notes inside the gaps created by the other plugins: for example, if the Chords stops playing, insert a Melody into the gap.

As the plugins are locked to the same key and scale, or interconnected to exchange other information back and forth, a composer's edits in one of the plugins automatically generates changes in other open plugins. For example, as a composer modifies chord progressions, chord lengths, complexities, and the like within the chord plugin, these changes are mirrored in the other plugins, such as the melody plugin. This means, for example, that when rhythms are changed to a specific rhythm and pattern in the chords plugin, the same effects take place within the other linked plugins 1228 and 1230. The plugins can detect if the same rhythm is used across multiple plugins, and update all the plugins at the same time. For example, if the bass is playing on the Offbeats, and the chords are playing on the Offbeats, changing the chords from "Offbeats>Ibiza preset" will automatically change Bassline from "Offbeats>Ibiza preset" as well.

After changes are made, a composer may determine whether the song composition is complete, or whether additional composition, such as inserting basslines will be further needed 1232. In one example, the composer may export the composed music piece to a DAW before opening a new linked plugin 1234. In yet another example, a composer may elect to compose additional portions of the music piece before exporting all of the plugins to the DAW. Regardless of the time of export, the plugins remain connected and linked at all times.

Figure 21:
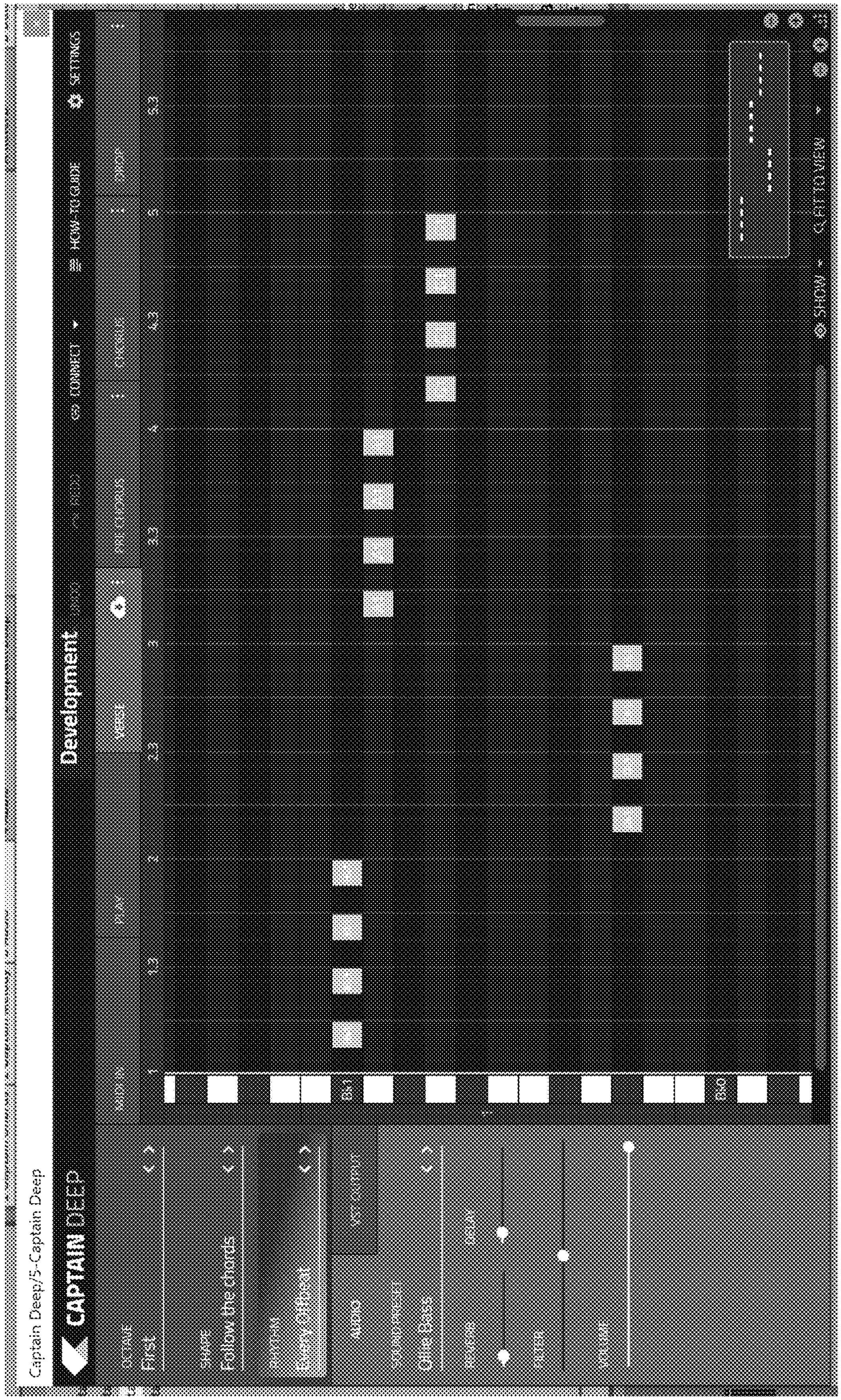
FIG. 21 illustrates updating a beat offset according to an embodiment.

In yet another example, FIG. 21 describes a bassline composing plugin. As previously described with the melodies plugin, the bassline plugin is also connected and linked to a chords plugin, and similarly, locked to the same key and scale as the chords.

Figure 22:
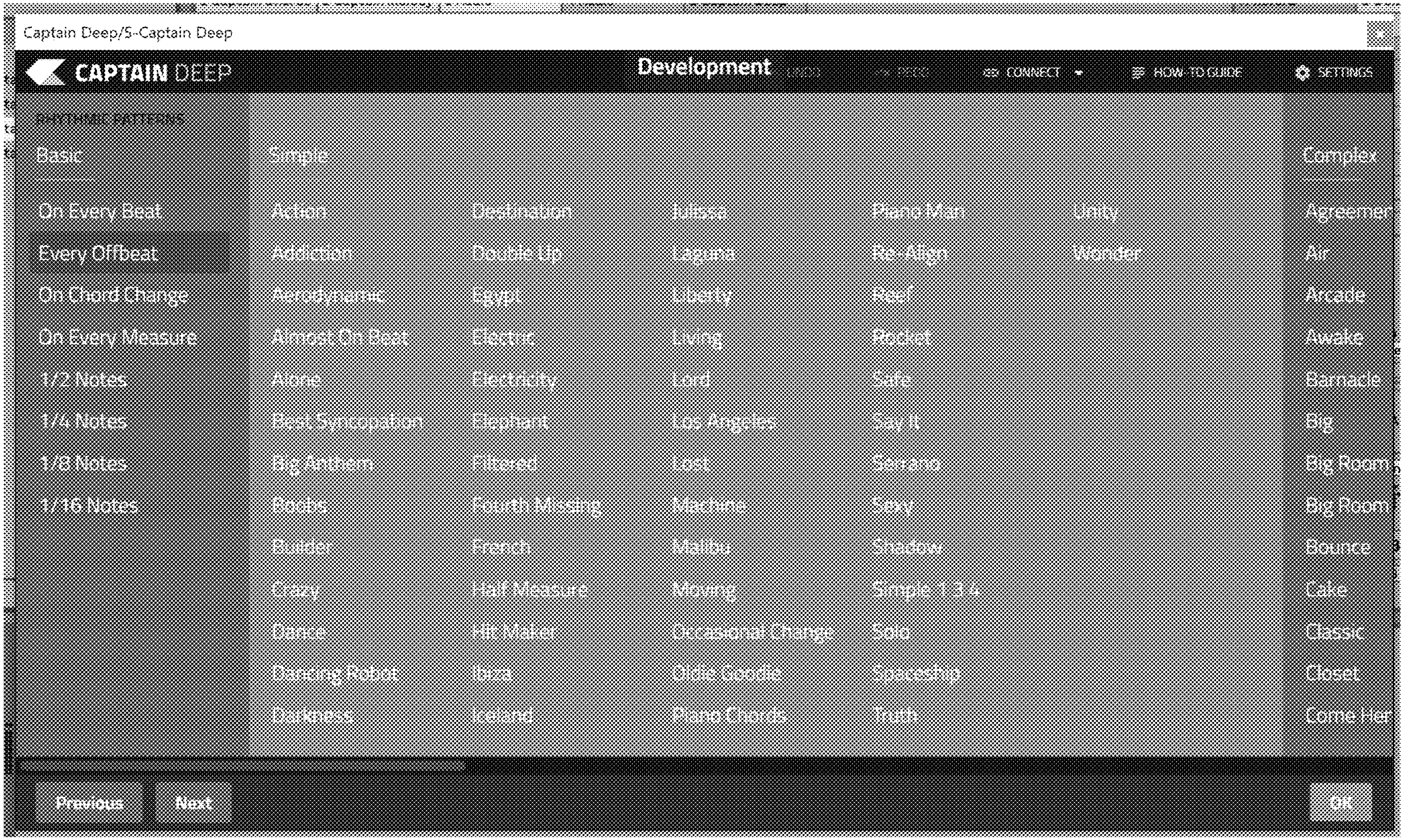
FIG. 22 illustrates state restoration by a DAW in a slave mode according to an embodiment.
Figure 23:
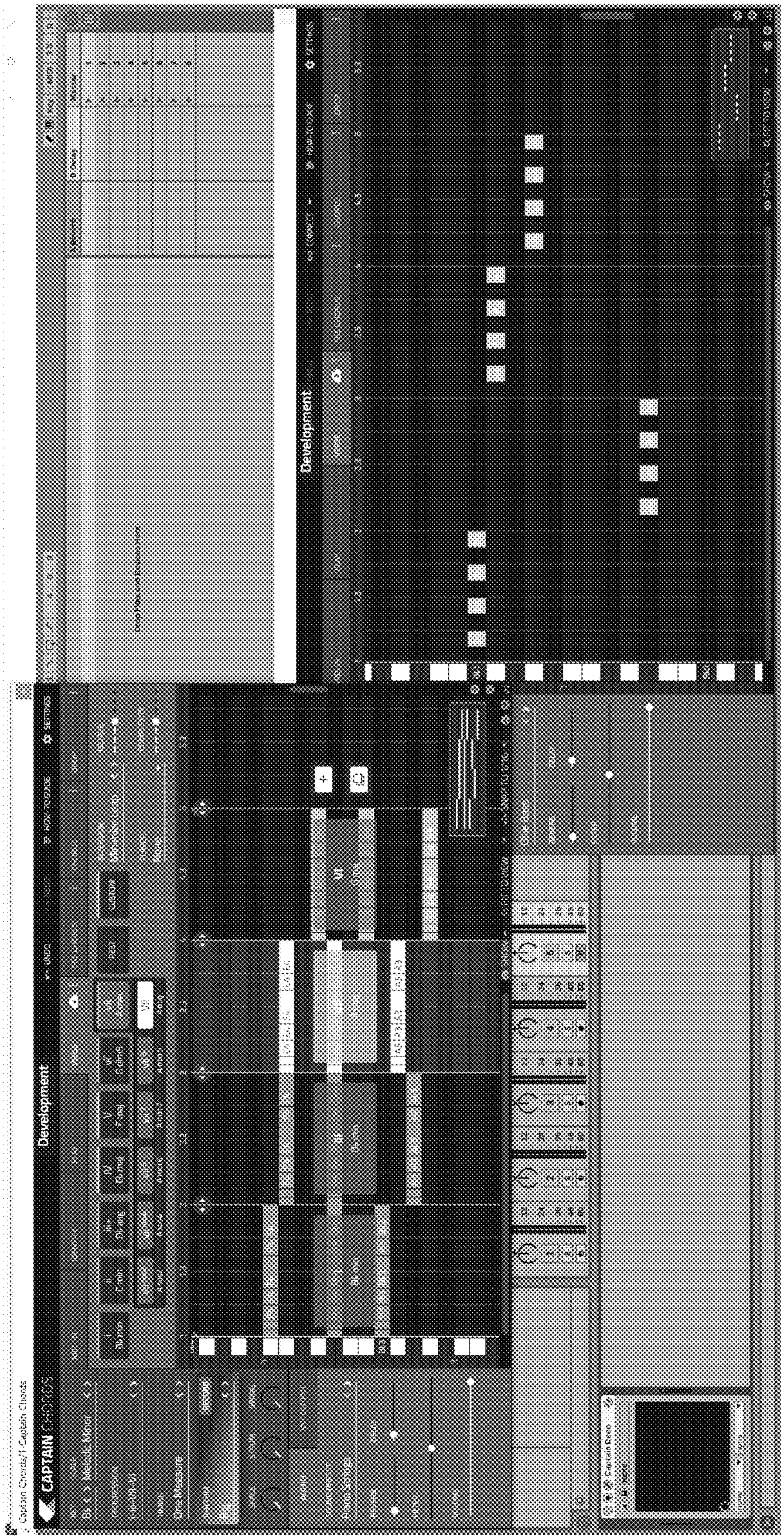
FIG. 23 illustrates keeping the selected tabs synchronized according to an embodiment.

FIG. 22 is an illustration of bassline presets that include trigger points, such as every offbeat, on chord change, on every beat or on every measure. In one embodiment, when a DAW sets a preset on a plugin, it does so by using the plugin's state restoration mechanisms. After state has been restored in a slave, the slave sends a notification to let its synced chords plugin (master plugin) know that there is a slave that needs its chord information updated. Accordingly, in the slave plugin, the DAW restores the state of the slave plugin. Then at the chords plugin, a check is made with a plugin controller that sent the notification to see if this chords plugin's identifier matches the identifier that the new slave is tracking. In one example, each plugin instance creates an 'identifier' for itself when it's first created. This identifier is also saved during state restoration, so it'll persist across DAW project launched. The slave plugins set a 'trackedIdentifier' property when they start following a chords instance, and that's how they identify which instance they're following. If the IDs do not match, then the chords plugin (master plugin) ignores the notification. On the other hand, if the IDs match, the master plugin resends all chord-state-related notifications. In turn, the slave plugin updates its chords information, updates its selected tab information, and updates its beat offset parameter.

FIG. 13 is an illustration of bassline and chords plugin synchronized to produce the music piece. As described herein, synchronizing plugins provides several advantages, including, for example, eliminating the need to edit each music producing environment separately, having the need for a working knowledge of music theory and music harmonization, and also musical composition. The synchronization allows users, of various levels of skill and knowledge in music theory, to produce harmonized musical pieces in an efficient and expeditious manner. Furthermore, the synchronization, coupled with linked display effects, as further described herein with regard to the tension, further simplifies the GUI and provides a user an simplified tool for producing musical pieces by allowing the user to control a minimum number of attributes (e.g. tension).

Accordingly, in one embodiment, synchronization may be performed according to the illustration of FIG. 13. In FIG. 13, when a selected tab of a chords plugin is changed to any of the song section tabs (e.g. verse, pre-chorus, chorus, or drop), the plugin sends out a notification so that all slaves can also update to the same tab. Similarly, when a song section tab is selected in a slave plugin, the slave plugin sends out a notification for its master to also update its selected tab, which in turn causes all connected slaves to be updated. The chords plugin also sends this notification in response to the slave sending the notification.

Figure 24:
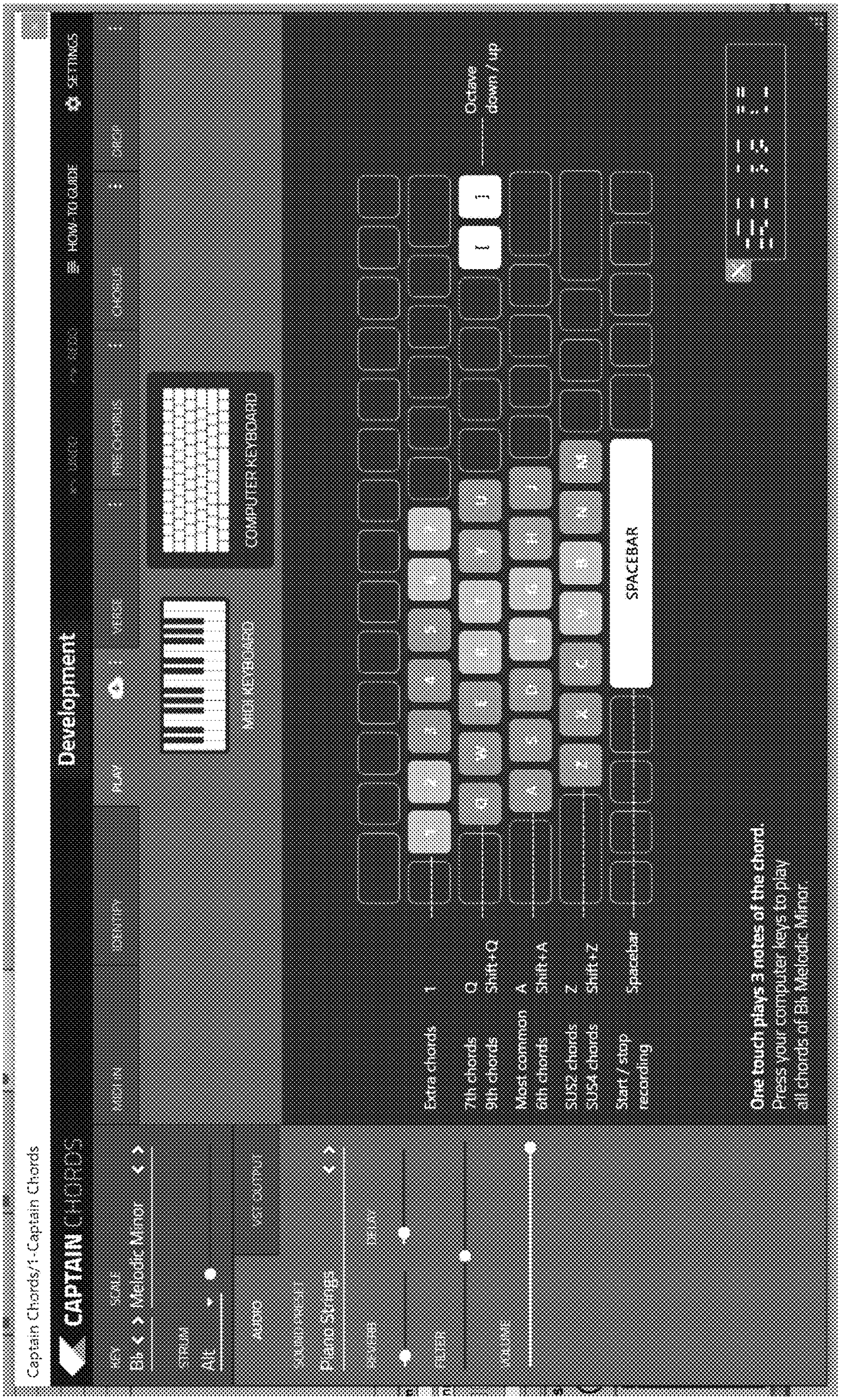
FIG. 24 illustrates fetching all running chords plugins according to an embodiment.

Each plugin includes a tab reserved for manual assisted composition. For example, as described in FIG. 24, the chord plugin includes a manual assisted composition user interface that allows a composer to use keys of a computer keyboard to write music chords. The assistance ensures that the various chords are all chosen within the selected key and scale. This also enables real time auditioning of various chords within the key and scale by using the computer's keyboard buttons, or a specially re-mapped MIDI piano that plays an entire chord from just one piano note. Some of the features include that the most common chords within the key and scale are triggered by pressing the computer keys A-J, with additional and more exotic chords located on the rows above and below. By using a combination of the common chords with some of the others, a composer can create interesting and sonically-pleasing progressions. Furthermore, both major and minor chords indicated in different colors can be combined to make progressions even more diverse. Different keys may activate different functions. In one example the shift key on the keyboard may be held, while pressing keys Z-M to trigger SUS 2 and 4 chords, while holding shift and pressing keys Q-U will trigger the $7^{th}$ and $9^{th}$ chords. Keys 1-7 will trigger extra chords found within the key and scale. Furthermore, to change octave up or down, a composer may toggle the bracket H keys on the keyboard.

In yet another example, by pressing the spacebar, the chords plugin will record each repetition of the loop and the chord progression that the composer has input live. This window of the plugin, as with other plugins, includes a piano map window that illustrates the chords, melodies, basslines, etc., that are produced in each plugin. This window may be dragged and dropped into a MIDI track within a DAW workstation. This instrument is useful to allow composers to try different chord progressions on the fly without interfering with the chord progressions or melody progressions they have been building. This enables a composer to experiment more freely while continuing to develop the chord progression in the other window. Alternatively, the composer may wish to use the created chord progression in this window and export that into the DAW workstation.

Figure 25:
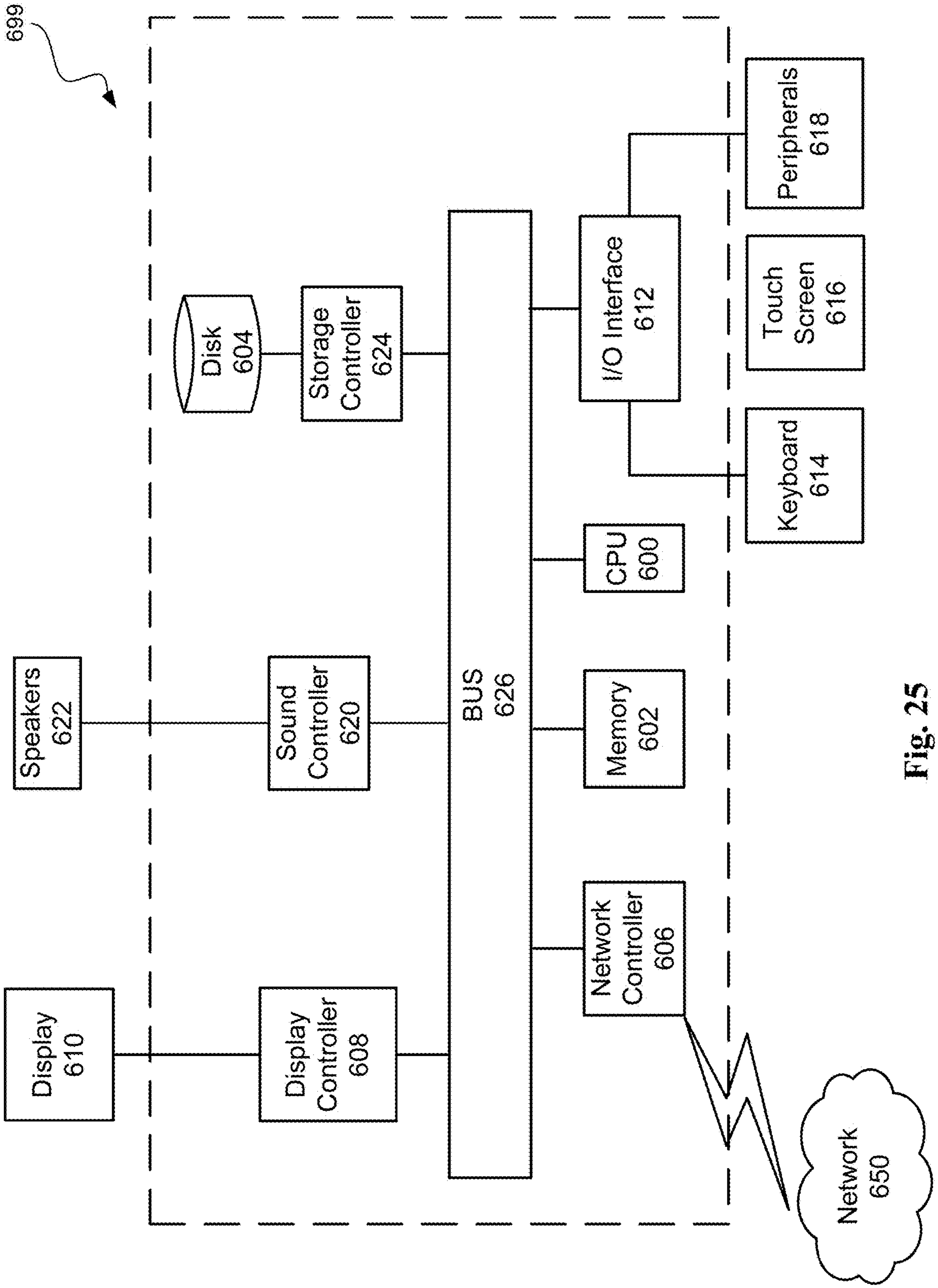
FIG. 25 illustrates fetching a specific captain plugin instance according to an embodiment.

In FIG. 25, the device 699 includes a CPU 600 which performs the processes described above. The device 699 may be a general-purpose computer or a particular, special-purpose machine. In one embodiment, the device 699 becomes a particular, special-purpose machine when the processor 600 is programmed to generate one or more musical pieces.

Note that device 699 may be a personal computer (PC), a tablet, a cellular/smart phone, a compact disk jockey (CDJ) device, or any other type of general device or DJ-specific device. Hence, the embodiments discussed herein with respect to the method 100 may be implemented on any of these devices.

The process data and instructions may be stored in at least one computer readable medium or memory 602 for holding the instructions programmed according to any of the teachings of the present disclosure and for containing data structures, tables, records, or other data described herein. These processes and instructions may also be stored on a storage medium disk 604 such as a hard drive (HDD) or portable storage medium or may be stored remotely. The instructions may be stored on CDs, DVDs, in FLASH memory, RAM, ROM, PROM, EPROM, EEPROM, hard disk or any other device with which the system communicates, such as a server or computer.

Further, the discussed embodiments may be provided as a utility application, background daemon, or component of an operating system, or combination thereof, executing in conjunction with CPU 600 and an operating system such as, but not limited to, Microsoft Windows, UNIX, Solaris, LINUX, Android, Apple MAC-OS, Apple iOS and other systems known to those skilled in the art.

CPU 600 may be any type of processor that would be recognized by one of ordinary skill in the art. For example, CPU 600 may be a Xenon or Core processor from Intel of America or an Opteron processor from AMD of America. CPU 600 may be a processor having ARM architecture or any other type of architecture. CPU 600 may be any processor found in a mobile device (for example, cellular/smart phones, tablets, personal digital assistants (PDAs), or the like). CPU 600 may also be any processor found in musical instruments (for example, a musical keyboard or the like).

Additionally or alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the processes described herein.

The computer 699 in FIG. 15 also includes a network controller 606, such as, but not limited to, a network interface card, for interfacing with network 650. As can be appreciated, the network 650 can be a public network, such as, but not limited to, the Internet, or a private network such as an LAN or WAN network, or any combination thereof and can also include PSTN or ISDN sub-networks. The network 650 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer 699 further includes a display controller 608, such as, but not limited to, a graphics adaptor for interfacing with display 610, such as, but not limited to, an LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners. The peripheral elements discussed herein may be embodied by the peripherals 618 in the exemplary embodiments.

A sound controller 620 may also be provided in the computer 699 to interface with speakers/microphone 622 thereby providing sounds and/or music. The speakers/microphone 622 can also be used to accept dictated words as commands.

The general purpose storage controller 624 connects the storage medium disk 604 with communication bus 626, which may be an ISA, EISA, VESA, PCI, or similar. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

Figure 26:
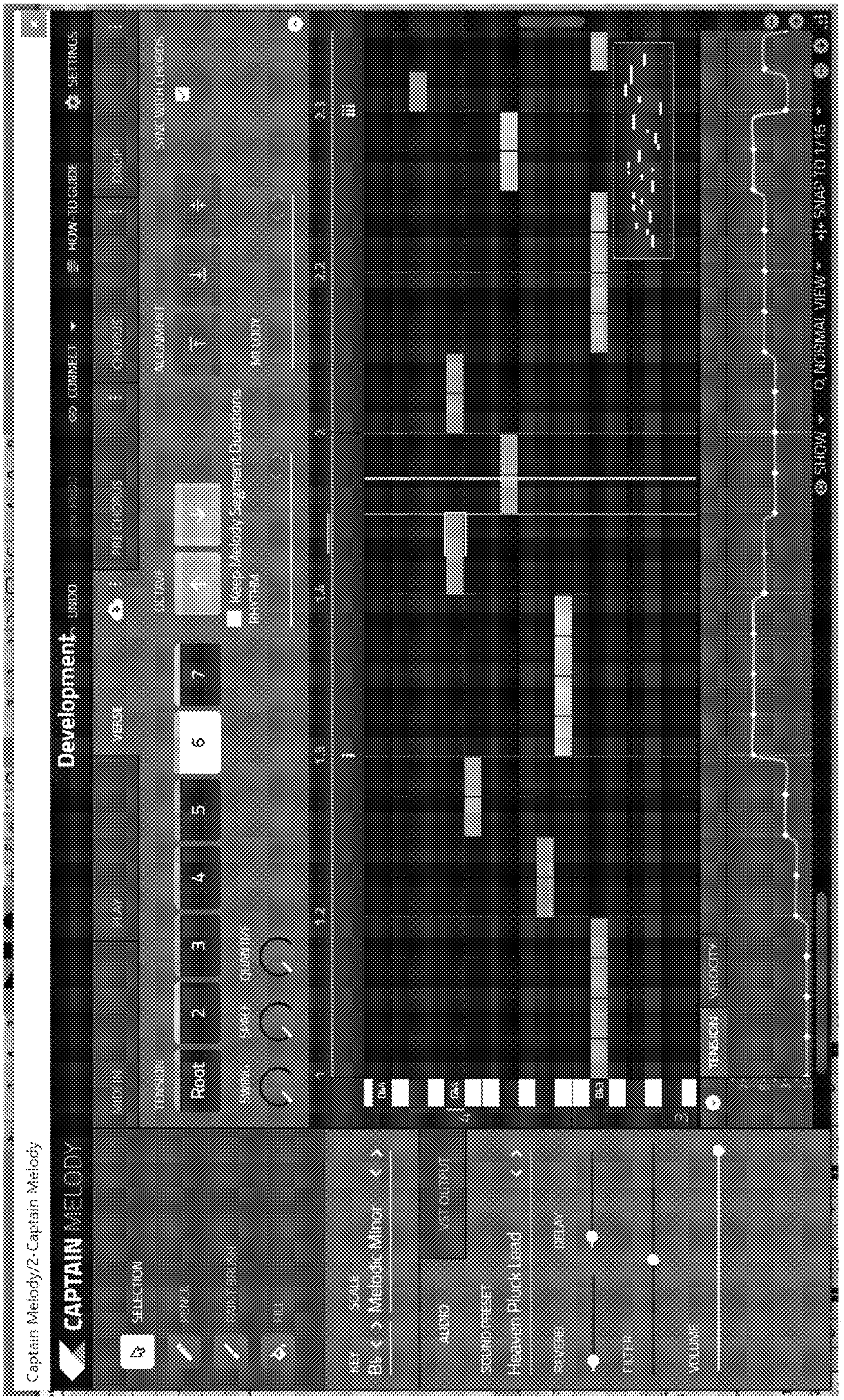
FIG. 26 illustrates a harmonic tension visual illustration that can be manipulated by the composer to change harmonic tension between different compositions of a musical piece.

FIG. 26 describes visual manipulation of harmonic tension within a plugin.

Harmonic Tension Curves

Harmonic tension describes the interaction between notes of varying pitches being played simultaneously and the perceived human emotional response to that interaction. Humans perceive different combinations of notes, in different contexts and voicings, as anticipatory or tense, and other combinations as relaxation or relief. In general, pitch combinations that produce higher dissonance tend to be perceived as having higher degrees of tension then notes that are in perfect harmony (or in unison). In the context of the Tension Curves feature, as illustrated in FIG. 26, harmonic tension describes the tension between the “target clip” (the note or notes being analyzed and manipulated by the software) and the “backing chords” (the sequence of chords as defined in the linked master Chords plugin).

The software will feature two features related to harmonic tension: visualization and manipulation. Both are concepts designed to simplify and enhance the composition of generating the musical piece.

Tension visualization may be implemented as a smoothly curved line graph that can be overlaid or placed above or below a “piano roll” or other canvas displaying the current musical clip’s MIDI. Peaks and valleys in the line graph will delineate the level of perceived tension created by the notes of the clip when compared to the backing chords, as measured by the level of dissonance between the notes and the backing chord (for example, notes can be classified as Root Notes, In Harmony, In Scale, In Tension level 1, In Tension level 2, etc). Level of tension is to be represented on the Y axis of the graph as distance from zero, meaning that tension can be represented as a peak high above baseline or as a valley below—the graph’s Y value will be positive for notes that are higher in pitch than the backing chord’s root note, or negative for notes below the root note. In this fashion deviations from the root note can be visualized in two dimensions—direction from root (higher or lower) and level of tension (height of peak or depth of valley).

Additionally, level of tension will be indicated as color gradient (perhaps from green to red) along the curved line. This will serve to reinforce to the user the notion that increases in tension are perceived as anticipatory and tense and should be relieved with corresponding resolution. Accordingly, it is envisioned that these color gradients may be accompanied by suggestive notifications providing a composer with alternatives and/or recommendations for how to best reduce the tension in a subsequent portion of the musical piece. This not only improves and simplifies music composition, but also simplifies the presentation and requirements by which musical pieces are composed (irrespective of the level of the music theory working knowledge of the composer).

Tension manipulation describes a feature wherein a clip under tension analysis may be manipulated via simple drag-and-drop operations to modify the actual notes without the user specifying which notes to use. Specifically, it will be implemented as “handles” (represented as circular stylized icons) overlaid on the tension curve in spots where there are notes (or clusters of notes in very fast musical segments). Notes under and around these handles will be altered according to these rules: as the user/composer drags the handle away from the baseline (indicating an increase in harmonic tension), notes will be moved in a stepwise fashion to the next degree of tension applicable within the key and scale, and according to the corresponding backing chord (for example, dragging the handle of a root note in the chord may move it from Root Note to Perfect Fifth, to 6th, to 7th, etc—the steps are defined in the algorithm. When handles are being dragged away from zero in a positive direction (Up), the notes will travel up the audible spectrum in terms of which pitches are selected for each tension step. When being dragged downward from zero, the notes produced will travel down the audible spectrum while still increasing in the tension level. This is important—tension goes up as you get further from zero, whether travelling upward or downward in relative pitch.

Conversely, as handles are dragged toward zero from a position above the root, notes will be selected in pitches downward as the tension level approaches zero. When dragging a handle from below zero upwards, pitches will ascend as tension approaches zero. In both cases, notes are descending the tension steps toward “Root Note” (zero tension), whether they are ascending or descending in pitch.

In this fashion, users can compose new melodies by adjusting the “tension line” of an existing melody. Users can also compose melodies from scratch by drawing a tension line over an existing chord progression and letting the software generate the notes for them. Once notes are generated, the software will display handles in the appropriate places along the curve to enable editing according to this heuristic: One handle per note unless there are more than one note within a configurable clustered note span (default to one beat), in which case only create one handle per configured clustered note span (one handle per one beat by default).

Adding and removing handles to the curved line is also possible. By executing some predefined user action (such as double-clicking in a certain spot in a curve), a user can create a new handle which will in turn spawn a midi note in the appropriate tension level at that place in the song (quantized to the nearest configurable quantization step, 1/16th beat default perhaps). Likewise, a user can remove a handle via some predefined user action (double-click again perhaps).

When a handle is removed in this fashion, the musical notes attached to the handle will be deleted and the tension line will be redrawn to accommodate the newly modified clip.

In this manner, the user has full control to add and remove notes, and move notes up and down along predefined tension steps in context to not only the key and scale, but also backing chords, without needing to know which notes are applicable in a given scenario. This will enable quick sketching of exotic and complex musical ideas with little to no musical training, and should enable a fluid workflow to experimenting with new musical ideas and composing melodies for both experienced and inexperienced music producers.

Whether standalone or communicating between each other, these plugins allow musicians and composers to: discover different cords by jamming out on the computer keyboard (as will be further described herein) using a play plugin. One touch of a keyboard button may play an entire chord. Another benefit is that the plugins automatically transpose the song to any key and scale, even after the composition has been written, apply different rhythms to melodies, basslines and chords, write arpeggiated melodies that stay 100% in key with the song, add basslines that follow the chords, add complex voicing to any chord, add passing chords, add $7^{th}$, $9^{th}$, and other notes, add thickness to any chord, split the chords and resize them.

Additionally, it is noted that the plugins allow real-time routing to other VST plugins, such as LennarDigital Sylenth1, Xfer's Serum, Massive and Kontakt, and many others. Composers can also drag-and-drop MIDI direct from the plugins into their preferred DAW workspace. Hardware output may also be available using the DAW; a composer can rout the respective plugin to the composer's preferred analogy synths such as Minimoog Voyager and other analog hardware that supports the MIDI protocol. The plugin represent a significant step forward in producing music. For professionals, the plugins offer advanced tools to generate the structure of the song, and write MIDI parts faster and better. For beginners, music theory becomes more accessible and easier to understand and visualize because all the relationships between melodies, chords and basslines become visually clear.

As previously described, a composer may elect to continue composing their musical piece by creating melodies for the music piece that they have already begun composing with chords. As such, the present disclosure enables a composer to create melodies which complement the chord progressions previously created in the chord plugin.

Moreover, in one example, changing the color of the MIDI notes based on their harmonic tension with the underlying chord may be implemented. As illustrated in FIG. 26, the notes are shown in the "canvas" area of the plugin, where you see their individual pitch. The device changes the MIDI note colors based on their tension. This enables a user to determine, from looking at the notes, what the tension is between each note in the melody and its corresponding counterpart in the chords. This level of tension can create desirable effects when managed, and can create undesirable effects, resulting in a musical piece segment that is not in harmony. Accordingly, this visual effect allows a user to expedite music creation process by simply managing the harmony between the notes of each of the master/slave (e.g. chord/melody) sequences using the harmonic tension display.

Furthermore, each slave plugin can change the color of its MIDI notes based on the tension with the master chords plugin that it's connected to. When the slave plugin is first loaded, or when chords change in the master plugin, the slave plugin requests a "tension mapping" for each segment. It maps certain notes to certain tension levels. This mapping varies from segment to segment of the song/musical piece, so the "C" note in the first part of the composition may not have the same color as the "C" note in another part of the composition. The slave plugin redraws notes with the correct "tension" color when they are added/removed/edited in any fashion. In doing so an exemplary color scheme may be used which corresponds to key's tension level. Examples of colors are: blue for low tension notes (such as notes that are the same as the chord notes in the master plugin/sequence), red for tense notes, and yellow for notes that don't belong in the key and scale of the composition. When chords change again in master plugin, the slave plugin gets the updated "tension mapping" again and redraws canvas anew with updated colors for each note.

Obviously, numerous modifications and variations of the present disclosure are possible in light of the above teachings. It is therefore to be understood that within the scope of the appended claims, the invention may be practiced otherwise than as specifically described herein.

For example, advantageous results may be achieved if the steps of the disclosed techniques were performed in a different sequence, if components in the disclosed systems were combined in a different manner, or if the components were replaced or supplemented by other components.

Based on the above descriptions of the invention, embodiments of the present disclosure provide apparatus and method for generating a musical piece. In one embodiment, the apparatus includes a processor or circuitry that receives a chord selection including a musical key and a scale selection, generates, within a digital audio work session, a chord progression sequence based on the received chord selection, the chord selection sequence including a selection of related chords within the selected key and scale, in response to a detected chord selection change, modify the chord progression sequence to include a chord progression corresponding to the chord selection change, sets the chord progression sequence as a master sequence, in response to detecting a second progression sequence within the digital audio work session, transmits an identifier to the second progression sequence, the identifier setting the second progression sequence as a slave sequence, and establishing a communication link between the master sequence and the slave sequence to synchronize the slave sequence and the master sequence, wherein changes made in the master sequence are automatically effectuated in the slave sequence, and combines the master sequence and the slave sequence to form a composed musical piece.

In yet another embodiment of the present disclosure, the slave sequence includes a melody progression sequence, the synchronizing between the master sequence and the slave sequence includes sharing rich metadata including musical instrument digital interface (MIDI) data between the master sequence and the slave sequence such that the slave sequence continuously updates the chord progression to correspond to the chord progression of the master sequence, and the effectuated change remains within the same selected key and scale.

Moreover, in response to activating a new slave sequence, the apparatus controls one or more master sequences to transmit an identifier associated with each one of the one or more master sequences to the new slave sequence, and in response to receiving one or more identifiers, the new slave sequence stores the one or more identifiers as possible master sequences that can be synchronized with, and selects a master sequence by selecting one of the one or more identifiers. Additionally, in response to a master sequence not being available, the circuitry removes the stored master sequence identification and causes the slave sequence to transmit a request to receive other identifications from other master sequences, and further request master sequence related information to be transmitted to the slave sequence, the master sequence related information including chord-related information such as key, scale, and chord progression.

In yet another embodiment, the master sequence is a chord progression sequence, the slave sequence is a melody progression sequence, the circuitry is further configured to display, on a graphical user interface (GUI) tabs associated with chord progression map, the tabs including verse, pre-chorus, chorus, or drop, and in response to a change in tab in the chord progression sequence, the circuitry is further changes the tab in the melody progression sequence to correspond to the changed tab in the chord progression sequence, and calculates a tension parameter between each element of the master sequence and each element of the slave sequence, the tension parameter indicating a level of harmony between each element of the master sequence and its corresponding counterpart in the slave sequence.

In another embedment, the circuitry may display an illustration of the tension parameter between the master sequence and the slave sequence, the illustration including changing characteristics of the displayed tension parameter based on whether the level of tension is above a threshold or below a threshold. In response to receiving a change in the tension parameter based on a user manipulation, the circuitry is further configured to change parameters associated with the master sequence and the slave sequence, the change corresponding to the level of change in the displayed tension parameter. Additionally, the circuitry may change a representation color of the MIDI notes based on the changes in the related harmonic tension. In response to the change in the tension parameter, the circuitry is further configured to draw a new melody note and edit a pitch of an existing MIDI note based on the change in the tension parameter.

In yet another embodiment, a method for generating a musical piece (song) may be presented, the method including receiving a chord selection including a musical key and a scale selection; generating, within a digital audio work session, a chord progression sequence based on the received chord selection, the chord selection sequence including a selection of related chords within the selected key and scale; in response to a detected chord selection change, modifying the chord progression sequence to include a chord progression corresponding to the chord selection change; setting the chord progression sequence as a master sequence; in response to detecting a second progression sequence within the digital audio work session, transmitting an identifier to the second progression sequence, the identifier setting the second progression sequence as a slave sequence, and establishing a communication link between the master sequence and the slave sequence to synchronize the slave sequence and the master sequence, changes made in the master sequence being automatically effectuated in the slave sequence, and combining the master sequence and the slave sequence to form a composed musical piece, wherein the slave sequence includes a melody progression sequence.

In yet another embodiment, the synchronizing between the master sequence and the slave sequence includes sharing rich metadata including musical instrument digital interface (MIDI) data between the master sequence and the slave sequence such that the slave sequence continuously updates the chord progression to correspond to the chord progression of the master sequence, wherein the effectuated change remains within the same selected key and scale.

The method further includes calculating a tension parameter between each element of the master sequence and each element of the slave sequence, the tension parameter indicating a level of harmony between each element of the master sequence and its corresponding counterpart in the slave sequence, and displaying an illustration of the tension parameter between the master sequence and the slave sequence, the illustration including changing characteristics of the displayed tension parameter based on whether the level of tension is above a threshold or below a threshold. Wherein, in response to receiving a change in the tension parameter based on a user manipulation, changing parameters associated with the master sequence and the slave sequence, the change corresponding to the level of change in the displayed tension parameter. And, in response to changing the tension parameter, drawing a new melody note and edit a pitch of an existing MIDI note based on the change in the tension parameter.

In yet another embodiment, there is provided a computer-readable storage medium having computer readable instructions that when executed by processing circuitry, cause the processing circuitry to perform an method for generating a musical piece (song), the method including receiving a chord selection including a musical key and a scale selection; generating, within a digital audio work session, a chord progression sequence based on the received chord selection, the chord selection sequence including a selection of related chords within the selected key and scale; in response to a detected chord selection change, modifying the chord progression sequence to include a chord progression corresponding to the chord selection change; setting the chord progression sequence as a master sequence; in response to detecting a second progression sequence within the digital audio work session, transmitting an identifier to the second progression sequence, the identifier setting the second progression sequence as a slave sequence, and establishing a communication link between the master sequence and the slave sequence to synchronize the slave sequence and the master sequence, changes made in the master sequence being automatically effectuated in the slave sequence, and combining the master sequence and the slave sequence to form a composed musical piece, wherein the slave sequence includes a melody progression sequence.

The present disclosure provides a system that improves composition of music pieces. Such improvements include time savings, complexity reduction in composition, and harmonic synergy between the different parts that comprise a musical piece. The present disclosure further provides a technological advancement in allowing plugins (progression sequences) to communicate with each other and to synchronize edits while being locked to the same key and scale, or other attributes. MIDI data may be shared between the plugins directly, or through an intermediary, such as a DAW. The seamless and automatic communication between the plugins allows for faster song writing and music production. The harmonic tension engine ensures that the entire song that is being composed is in key, and is in harmony, while giving musicians total freedom in writing music that stays cohesive with the rest of the song. The features of how the tension is displayed allow for a composer to quickly understand how a melodic or a beat note may be off-harmony or non-compatible with the associated chord and allow the user to make modifications on a graphical user interface that would affect the note (i.e. reduce or increase the tension). This results in greater harmony between notes generated in different plugins, and further allows a user to make a singular edit in one location that will be translated/effectuated in multiple progression sequences simultaneously. Other features include using a computer keyboard to use or test out different chords by using different keyboard buttons. One touch of a keyboard button plays the entire chord. Another benefit is the automatic transposition of song to any key and scale, even after the composition has already been written. Also, allows for the application of different rhythms to melodies, basslines and chords and enable a composer to write arpeggiated melodies that stay 100% in key with the song.

The invention claimed is:

1. An apparatus, comprising:

processing circuitry configured to in response to a detection of a chord selection change, modify a first sequence including a chord progression sequence within a digital audio work session to include a chord progression corresponding to the chord selection change, in response to detecting a second sequence operating within the digital audio work session, establish a communication link between the first sequence and the second sequence to synchronize the second sequence and the first sequence, wherein changes made in the first sequence are automatically effectuated in the second sequence, and display a visual indicator indicating a harmonic relationship between an element of the first sequence and an element of the second sequence, wherein the processing circuitry is configured to display the visual indicator in an overlaid fashion on a visual representation of the first sequence or a visual representation of the second sequence.

2. A method, comprising:

in response to a detection of a chord selection change, modifying a first sequence including a chord progression sequence within a digital audio work session to include a chord progression corresponding to the chord selection change;

in response to detecting a second sequence operating within the digital audio work session, establishing a communication link between the first sequence and the second sequence to synchronize the second sequence and the first sequence, wherein changes made in the first sequence are automatically effectuated in the second sequence; and displaying a visual indicator indicating a harmonic relationship between an element of the first sequence and an element of the second sequence, wherein the displaying displays the visual indicator in an overlaid fashion on a visual representation of the first sequence or a visual representation of the second sequence.

3. The method according to claim 2, further comprising:

changing a representation color of notes based on changes in the relationship.

4. A method, comprising:

in response to a detection of a chord selection change, modifying a first sequence including a chord progression sequence within a digital audio work session to include a chord progression corresponding to the chord selection change;

in response to detecting a second sequence operating within the digital audio work session, establishing a communication link between the first sequence and the second sequence to synchronize the second sequence and the first sequence, wherein changes made in the first sequence are automatically effectuated in the second sequence; and displaying a visual indicator indicating a harmonic relationship between an element of the first sequence and an element of the second sequence, wherein the harmonic relationship indicates a level of harmony between an element of the first sequence and an element of the second sequence.

5. The method according to claim 4, wherein the displaying displays the visual indicator as a graph.

6. The method according to claim 5, wherein the displaying displays the level of harmony as a gradient along the graph.

7. The method according to claim 4, wherein the displaying displays the visual indicator in an overlaid fashion on a visual representation of the first sequence or a visual representation of the second sequence.

8. The method according to claim 4, wherein the displaying displays the visual indicator above or below a visual representation of the first sequence or a visual representation of the second sequence.

9. A method, comprising:

in response to a detection of a chord selection change, modifying a first sequence including a chord progression sequence within a digital audio work session to include a chord progression corresponding to the chord selection change;

in response to detecting a second sequence operating within the digital audio work session, establishing a communication link between the first sequence and the second sequence to synchronize the second sequence and the first sequence, wherein changes made in the first sequence are automatically effectuated in the second sequence;

displaying a visual indicator indicating a harmonic relationship between an element of the first sequence and an element of the second sequence;

displaying tabs associated with chord progression sequences; and in response to a change in a tab in the first sequence, changing a tab in the second sequence to correspond to the changed tab in the first sequence.

10. The method according to claim 9, wherein the displaying displays the visual indicator above or below a visual representation of the first sequence or a visual representation of the second sequence.

11. A method, comprising:

in response to a detection of a chord selection change, modifying a first sequence including a chord progression sequence within a digital audio work session to include a chord progression corresponding to the chord selection change;

in response to detecting a second sequence operating within the digital audio work session, establishing a communication link between the first sequence and the second sequence to synchronize the second sequence and the first sequence, wherein changes made in the first sequence are automatically effectuated in the second sequence; and displaying a visual indicator indicating a harmonic relationship between an element of the first sequence and an element of the second sequence, wherein the synchronizing between the first sequence and the second sequence includes sharing metadata including musical instrument digital interface (MIDI) data between the first sequence and the second sequence such that the second sequence continuously updates a progression sequence of the second sequence to correspond to the chord progression of the first sequence.

12. The method according to claim 11, wherein the displaying displays the visual indicator in an overlaid fashion on a visual representation of the first sequence or a visual representation of the second sequence.

13. A non-transitory computer-readable storage medium including computer executable instructions, wherein the instructions, when executed by a computer, cause the computer to perform a method, the method comprising:

in response to a detection of a chord selection change, modifying a first sequence including a chord progression sequence within a digital audio work session to include a chord progression corresponding to the chord selection change;

in response to detecting a second sequence operating within the digital audio work session, establishing a communication link between the first sequence and the second sequence to synchronize the second sequence and the first sequence, wherein changes made in the first sequence are automatically effectuated in the second sequence; and displaying a visual indicator indicating a harmonic relationship between an element of the first sequence and an element of the second sequence, wherein the displaying displays the visual indicator in an overlaid fashion on a visual representation of the first sequence or a visual representation of the second sequence.

14. The non-transitory computer-readable storage medium according to claim 13, wherein the harmonic relationship indicates a level of harmony between an element of the first sequence and an element of the second sequence.

15. The non-transitory computer-readable storage medium according to claim 14, wherein the displaying displays the visual indicator as a graph.

16. The non-transitory computer-readable storage medium according to claim 15, wherein the displaying displays the level of harmony as a gradient along the graph.

17. The non-transitory computer-readable storage medium according to claim 13, further comprising:

displaying tabs associated with chord progression sequences; and in response to a change in a tab in the first sequence, changing a tab in the second sequence to correspond to the changed tab in the first sequence.

18. The non-transitory computer-readable storage medium according to claim 13, wherein the synchronizing between the first sequence and the second sequence includes sharing metadata including musical instrument digital interface (MIDI) data between the first sequence and the second sequence such that the second sequence continuously updates a progression sequence of the second sequence to correspond to the chord progression of the first sequence.

19. The non-transitory computer-readable storage medium according to claim 13, further comprising:

changing a representation color of notes based on changes in the relationship.

* * * * *